US011133969B2

(12) United States Patent
Abdoli et al.

(10) Patent No.: US 11,133,969 B2
(45) Date of Patent: Sep. 28, 2021

(54) LOW PEAK TO AVERAGE POWER RATIO SINGLE TONE SPARSE TRANSMISSION

(71) Applicants: Javad Abdoli, Kanata (CA); Sanjeewa Herath, Ottawa (CA); Alireza Bayesteh, Ottawa (CA)

(72) Inventors: Javad Abdoli, Kanata (CA); Sanjeewa Herath, Ottawa (CA); Alireza Bayesteh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 34 days.

(21) Appl. No.: 16/559,865

(22) Filed: Sep. 4, 2019

(65) Prior Publication Data

US 2021/0067392 A1    Mar. 4, 2021

(51) Int. Cl.
H04L 27/26    (2006.01)

(52) U.S. Cl.
CPC ...... H04L 27/2621 (2013.01); H04L 27/2636 (2013.01)

(58) Field of Classification Search
None
See application file for complete search history.

(56) References Cited

U.S. PATENT DOCUMENTS

| | | | |
|---|---|---|---|
| 10,320,456 B2 | 6/2019 | Taherzadeh Boroujeni et al. | |
| 10,425,198 B2 | 9/2019 | Baligh et al. | |
| 2016/0049999 A1 | 2/2016 | Taherzadeh Boroujeni et al. | |
| 2016/0065275 A1 | 3/2016 | Reuven et al. | |
| 2018/0212809 A1* | 7/2018 | Bakulin | H04B 7/0465 |

FOREIGN PATENT DOCUMENTS

| | | |
|---|---|---|
| CN | 101263676 A | 9/2008 |
| CN | 105141566 A | 12/2015 |
| CN | 107534638 A | 1/2018 |

OTHER PUBLICATIONS

Sahin, Alphan et al. "DFT-Spread OFDM with Frequency Domain Reference Symbols", GLOBCOM 2017-2017 IEEE Global Communication Conference, Jan. 15, 2018 (Jan. 15, 2018), total 6 pages.

Ciochina, Cristina et al. "New PAPR-Preserving Mapping Methods for Single-Carrier FDMA with Space-Frequency Block Codes" IEEE Transactions on Wireless Communications, Oct. 31, 2009 (Oct. 31, 2009) No. 10 vol. 8, Section II A, total 11 pages.

Ciochina, Cristina et al., "An analysis of three multiple access techniques for the uplink of future cellular mobile systems", European Transactions on Telecommunications, Jun. 3, 2008 (Jun. 3, 2008) No. 5 vol. 19, Section 2, total 8 pages.

* cited by examiner

Primary Examiner — Kouroush Mohebbi

(57) ABSTRACT

Aspects of the present application use a linear transformation of a sparse mapped single carrier transmission at a transmitter, for which a comparable inverse transform of the linear transform applied at the transmitter can be applied at the receiver. The linear transform reduces the sparsity of sparse mapped symbols. The use of the linear transform to reduce the sparsity enables peak-to-average power ratio (PAPR) and/or cubic metric to be reduced as compared to if the linear transform is not used. The linear transforms may be implemented in a block-wise manner, element-wise manner or combination thereof.

21 Claims, 20 Drawing Sheets

| | | PAPR (dB) | | | | | |
|---|---|---|---|---|---|---|---|
| Sparse pattern index | | 1 | 2 | 3 | 4 | 5 | 6 |
| 4-point SCMA | | 4.2682 | 4.5465 | 5.1406 | 4.2682 | 4.5486 | 4.2682 |
| pi/2-BPSK IGMA | | 4.2682 | 4.2343 | 4.2682 | 4.2682 | 4.2343 | 4.2682 |
| 4-point SCMA + Hadamard4 | | 1.7231 | 1.4380 | 2.1362 | 2.1672 | 2.1740 | 1.6271 |
| 4-point SCMA + DFT4 | | 4.5083 | 1.7246 | 4.5082 | 5.0140 | 2.9150 | 5.0139 |
| pi/2-BPSK IGMA + Hadamard4 | | 2.4817 | 2.3032 | 2.1373 | 2.4331 | 2.9829 | 2.0052 |
| pi/2-BPSK IGMA + DFT4 | | 4.5082 | 2.4805 | 4.5086 | 5.3305 | 2.9108 | 5.3270 |
| Sparse pattern index | | 1 | 2 | 3 | 4 | 5 | 6 |
| 8-point SCMA | | 4.3800 | 4.5709 | 5.1501 | 4.3802 | 4.5703 | 4.3802 |
| 8-point SCMA + Hadamard4 | | 5.0330 | 4.8153 | 5.1107 | 5.0965 | 5.5530 | 4.7104 |
| 8-point SCMA + pi/4 + Hadamard4 | | 4.5289 | 4.3188 | 4.4517 | 4.6685 | 5.0310 | 4.0978 |
| 8-point SCMA + DFT4 | | 4.8503 | 5.0335 | 4.8555 | 5.3613 | 4.7106 | 5.3796 |
| 8-point SCMA + pi/4 + DFT4 | | 4.3769 | 4.5294 | 4.2384 | 4.8841 | 4.3631 | 4.8703 |
| 8-point SCMA + pi/4 + DFT2 | | 6.5574 | 2.1733 | 2.7142 | 2.7265 | 2.7596 | 6.5573 |
| Sparse pattern index | | 1 | 2 | 3 | 4 | 5 | 6 |
| pi/4-QPSK IGMA | | 4.8935 | 4.4578 | 4.8937 | 4.8935 | 4.4588 | 4.8934 |
| pi/4-QPSK IGMA + Hadamard4 | | 4.7188 | 4.5310 | 4.3430 | 4.7378 | 5.2216 | 4.2298 |
| pi/4-QPSK IGMA + DFT4 | | 4.2972 | 4.7195 | 4.2898 | 4.8701 | 4.4404 | 4.8927 |
| pi/4-QPSK IGMA + DFT2 | | 6.5574 | 2.1580 | 2.7207 | 2.7238 | 2.7409 | 6.5573 |

FIG. 17

LOW PEAK TO AVERAGE POWER RATIO SINGLE TONE SPARSE TRANSMISSION

TECHNICAL FIELD

The present invention relates generally to telecommunications, and in particular embodiments, to systems and methods for a low peak to average power ratio (PAPR) and/or cubic metric having a sparse transmission.

BACKGROUND

Sparse transmission is a transmission type in which the data having N elements is mapped to a transmission resource having M elements, wherein M and N are integer values, M>N and M−N elements are zero elements. Sparse transmission is a technique to increase multi-user capacity of a telecommunication system while keeping receiver complexity at a manageable level. Example scenarios where sparsity may be helpful include 1) grant-based overloaded transmission, i.e. when a number of scheduled user equipments (UEs) sharing a set of orthogonal resources is larger than a number of orthogonal resources and 2) configured grant transmission where a number of potentially active UEs sharing a set of orthogonal resources is larger than a number of orthogonal resources. Several examples of sparse multiuser transmission are sparse code multiple access (SCMA) interleaved grid multiple access (IGMA), and pattern divisional multiple access (PDMA).

Machine-type communication (MTC) refers to a family of scenarios which involve connectivity of several machine-type devices to a base station (BS). In some scenario UEs may be considered MTC devices. It should be understood that MTC devices, even when considered to be UEs, may not have a user or may perform functions without direct input from a user. Each MTC device may typically have low data rate traffic or short packet transmission, and depending on geographical location of the device with respect to the BS, such as the distance between the MTC device and BS or the type of geographic terrain, the channel quality between the two devices may be affected. Examples of MTC devices or UEs in low-coverage condition are those located close to a cell-edge in a cellular network or those located in potentially blocked areas, such as sensors located in basements of buildings.

Moreover, battery life of devices is an important factor in MTC and therefore power consumption should be kept as low as possible. As such, MTC systems typically use a relatively small bandwidth for communication with each device. In LTE narrow band internet of things (NB-IoT), scheduled bandwidths as narrow as one subcarrier for transmissions of cyclic prefix orthogonal divisional multiple access (CP-OFDMA) are supported.

In a single-subcarrier transmission, each UE is assigned one subcarrier for DL or UL transmission. As mentioned, LTE NB-IoT supports single-subcarrier transmission using CP-OFDMA, i.e. a rectangular pulse shape including a CP. In general, a single-subcarrier transmission can use any designed pulse shape which is appropriate for the system under consideration.

In a single-subcarrier sparse transmission, transmitted symbols are sparse in the time-domain, and only a single subcarrier is used in frequency domain. Time-domain sparsity increases the PAPR and/or cubic metric (CM) of the transmitted signal due to power variations caused by transmission of zero symbols in time-domain. However, an increased PAPR and/or cubic metric is counter to trying to reduce power consumption for improve performance. Therefore, reducing PAPR and/or cubic metric while at the same time providing opportunity for a single-subcarrier sparse transmission would be beneficial to communication systems.

SUMMARY

In some aspects of the application, there is provided a method for reducing Peak-to-Average Power Ratio (PAPR) and/or cubic metric (CM) in a single subcarrier transmission. The method involves mapping a first group of symbols to a second group of symbols, wherein the second group of symbols is greater in number than the first group of symbols and a least one element of the second group of symbols is a zero element resulting in the second group of symbols having a higher sparsity than the first group of symbols; transforming the second group of symbols into a third group of symbols using a linear transform that reduces the sparsity of the third group of symbols in comparison to the second group of symbols; and transmitting the third group of symbols on a single subcarrier.

In some embodiments, the method further involves: prior to transmitting, performing a parallel to serial (P/S) conversion on the third group of symbols; and subsequent to the P/S/conversion, performing at least one of pulse shaping and a subcarrier shift.

In some embodiments, the method further involves: prior to transmitting, performing a parallel to serial (P/S) conversion on the third group of symbols; subsequent to the P/S conversion, mapping the third group of symbols to the single subcarrier; subsequent to the mapping, performing an inverse fast Fourier transform (IFFT); and subsequent to the IFFT, performing a cyclic prefix insertion.

In some embodiments, transforming the second group of symbols using a linear transform comprises transforming two or more subsets of the second group of symbols each with a respective linear transform, the two or more linear transforms collectively producing the third group of symbols.

In some embodiments, the method further involves performing a phase shift on at least one symbol of the second group of symbols.

In some embodiments, the method further involves performing a block-wise phase shift on all of the symbols of the third group of symbols.

In some embodiments, the transforming is performed as a matrix operation and the linear transform is a unitary matrix.

In some embodiments, the unitary matrix is any one of: a discrete Fourier transform (DFT) matrix; an inverse DFT (IDFT) matrix; and a Hadamard matrix.

In some embodiments, the linear transform is one of: a predefined linear transform; a modulation and coding scheme (MCS) specific linear transform; a sparsity pattern specific linear transform; and a user equipment (UE) specific linear transform.

In some embodiments, the method further involves receiving an identification of the linear transform using higher layer signaling.

In some embodiments, the method further involves receiving an identification of the MCS specific linear transform using higher layer signaling.

In some embodiments, the method further involves receiving an identification of the sparsity pattern specific linear transform using higher layer signaling.

In some embodiments, the method further involves receiving an identification of the UE specific linear transform using higher layer signaling.

In some embodiments, the method further involves changing values of both the linear transform and a sparsity pattern at the same time.

In some embodiments, a) the hopping group includes hopping pairs, each pair having a same linear transform and different sparsity patterns; or b) the hopping group includes hopping pairs, each pair having one of multiple different linear transforms and one of multiple different sparsity patterns.

In some embodiments, the method further involves changing values of the linear transform and the sparsity pattern independently of each other.

In some embodiments, the method further involves, prior to mapping the first group of symbols to the second group of symbols, receiving configuration information to be used for defining a transmission resource for the first group of symbols on a single subcarrier.

In some embodiments, the configuration information is: configured grant configuration information; or grant based configuration information.

In some aspects of the application, there is provided a method for receiving a single subcarrier transmission. The method involves receiving a transmission including a first group of symbols on a single subcarrier, the first group of symbols having a sparsity determined at a transmit point; transforming the first group of symbols into a second group of symbols using a linear transform that increases the sparsity of the second group of symbols in comparison to the first group of symbols; and performing multi-user detection on the second group of symbols.

In some embodiments, the method further involves, prior to transforming the received transmission: performing at least one of pulse shaping and a subcarrier shift on the received transmission; and performing a serial to parallel (S/P) conversion.

In some embodiments, the method further involves, prior to transforming the received transmission: performing a cyclic prefix removal on the received transmission; performing a fast Fourier transform (FFT); de-mapping the received transmission from the single subcarrier; and performing a serial to parallel (S/P) conversion.

In some embodiments, the method further involves, prior to performing multi-user detection on the second group of symbols, performing a phase shift on at least one symbol of the second group of symbols.

In some embodiments, the method further involves, prior to performing transforming the received transmission, performing a block-wise phase shift on all of the symbols of the first group of symbols.

In some embodiments, the transforming is performed as a matrix operation and the linear transform utilizes a unitary matrix.

In some embodiments, the unitary matrix is any one of: a discrete Fourier transform (DFT) matrix; an inverse DFT (IDFT); and a Hadamard matrix.

In some embodiments, the linear transform is one of: a predefined linear transform; a modulation and coding scheme (MCS) specific linear transform; a sparsity pattern specific linear transform; and a user equipment (UE) specific linear transform.

In some embodiments, the method further involves transmitting an identification of the MCS specific linear transform using higher layer signaling.

In some embodiments, the method further involves transmitting an identification of the sparsity pattern specific linear transform using higher layer signaling.

In some embodiments, the method further involves transmitting an identification of the UE specific linear transform using higher layer signaling.

In some embodiments, receiving a transmission including a first group of symbols on a single subcarrier involves receiving transmissions from more than one source and at least two of the sources use different linear transforms prior to transmission, the steps of transforming the first group of symbols into a second group of symbols and performing multi-user detection involve: transforming first groups of symbols into second groups of symbols using a first linear transform; decoding the second group of symbols that have been transformed using the first linear transform; performing successive interference cancellation (SIC) to remove the decoded second groups of symbols from the received transmissions; transforming remaining first groups of symbols into second groups of symbols using a second linear transform; and decoding the second groups of symbols that have been transformed using the second linear transform.

In some embodiments, the method further involves, prior to receiving a transmission including a first group of symbols on a single subcarrier, transmitting configuration information to be used for defining a transmission resource for the third group of symbols on a single subcarrier.

In some embodiments, the configuration information is configured grant configuration information or grant based configuration information.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 17 is a table showing experimental results from simulations of different types of single carrier sparse mapping transmission results according to aspects of the present disclosure.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Aspects of the present application use a linear transformation of a sparse mapped single carrier transmission at a transmitter, for which a comparable inverse linear transform can be applied at the receiver. The linear transformation performed on a set of symbols already having a sparsity reduces the sparsity of the set of symbols before transmission. The use of the linear transform enables peak-to-average power ratio (PAPR) and/or cubic metric to be reduced as compared to if the linear transform reducing the sparsity is not used. The linear transform may be implemented in a block-wise manner, element-wise manner or combination thereof.

Figure 1:
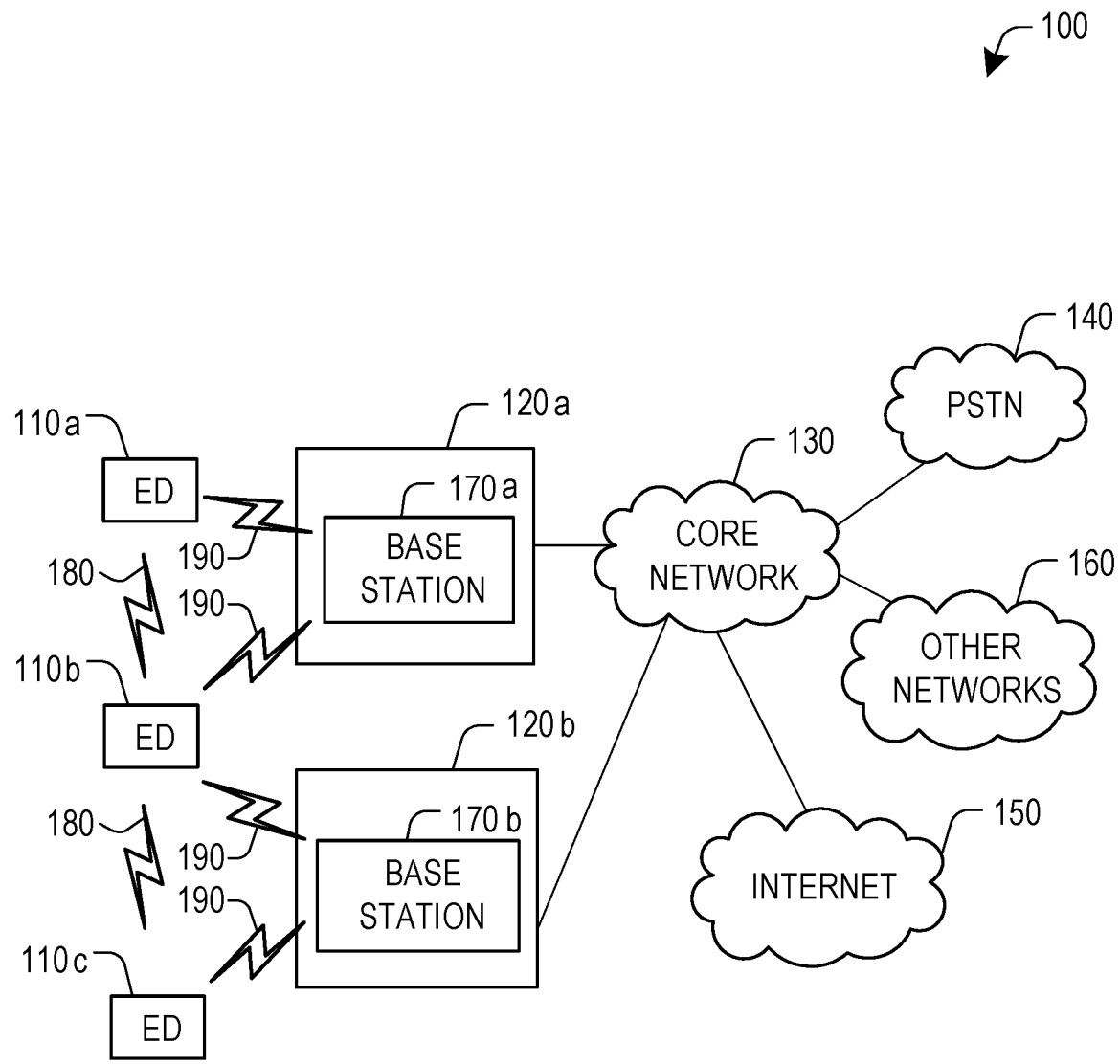
FIG. 1 is a schematic diagram of a communication system in which embodiments of the disclosure may occur.
Figure 2A:
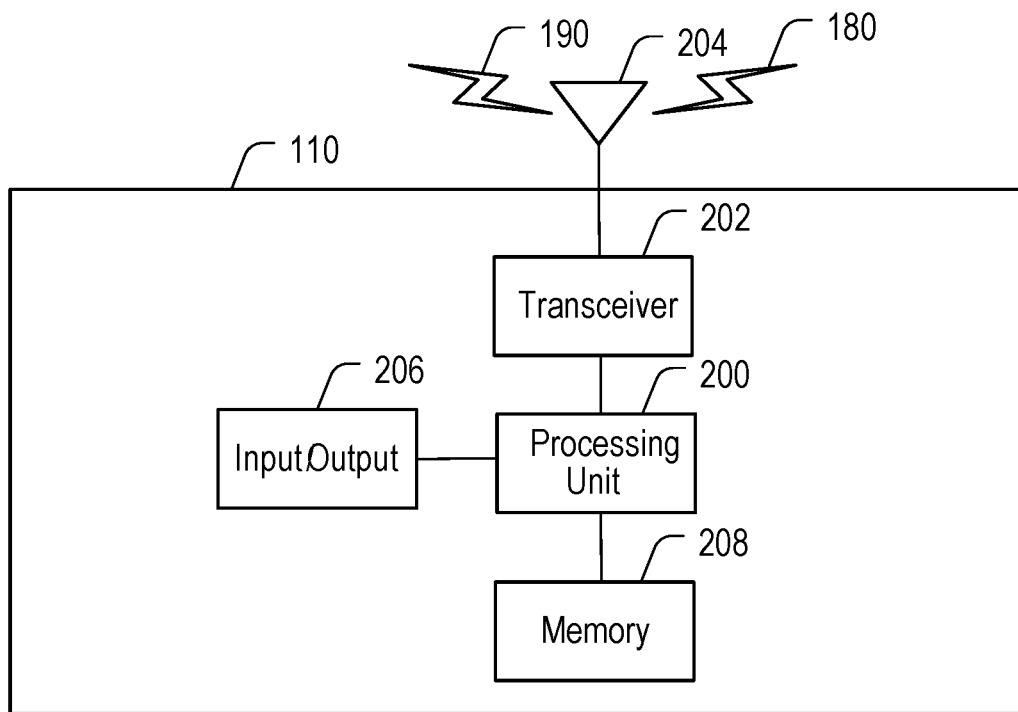
FIGS. 2A and 2B are block diagrams of an example user equipment and base station, respectively.
Figure 2B:
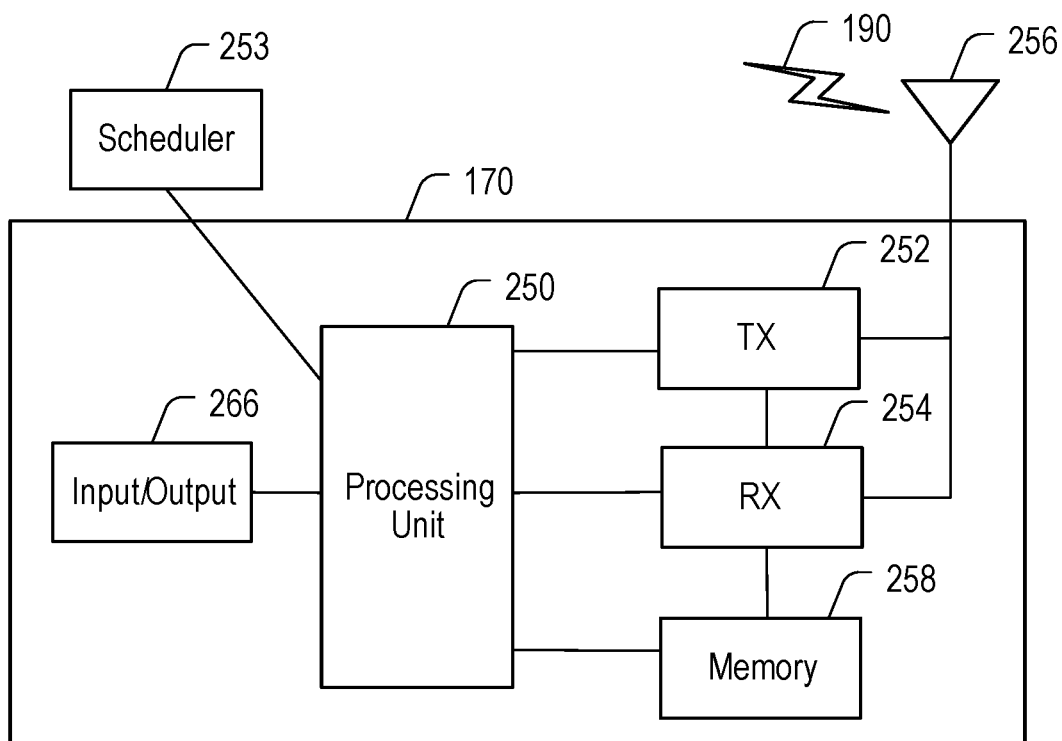

FIGS. 1, 2A, and 2B provide context for the network and device that may be in the network and that may implement aspects of the present disclosure.

FIG. 1 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. Although certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), single-subcarrier OFDMA, or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more sidelink (SL) air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), single-subcarrier OFDMA, or single-carrier FDMA (SC-FDMA) in the SL air interfaces 180. In some embodiments, the SL air interfaces 180 may be, at least in part, implemented over unlicensed spectrum.

In this disclosure, the SL transmissions between cooperating UEs may be "grant-free" transmissions or as a mode for data transmissions that are performed without communicating dynamic scheduling. Grant-free transmissions are sometimes called "configured grant", "grant-less", "schedule free", or "schedule-less" transmissions. Grant-free SL transmissions can also be referred to as SL "transmission without grant", "transmission without dynamic grant", "transmission without dynamic scheduling", or "transmission using configured grant", for example.

A configured grant transmission typically requires the receiver to know the parameters and resources used by the transmitter for the transmission. However, in the context of SL transmissions, the receiving UE is typically not aware of the transmitting UE's configuration parameters, such as which UE is transmitting, the ultimate target of the data (e.g., another UE), the time-domain and frequency-domain communication resources used for the transmission, and other control information. Various methods may be used to provide the configuration parameters and control information necessary for enabling configured grant transmissions in SL.

In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the UEs 110 and the base stations 170 are known to those of skill in the art. As such, these details are omitted here for clarity.

Figure 4:
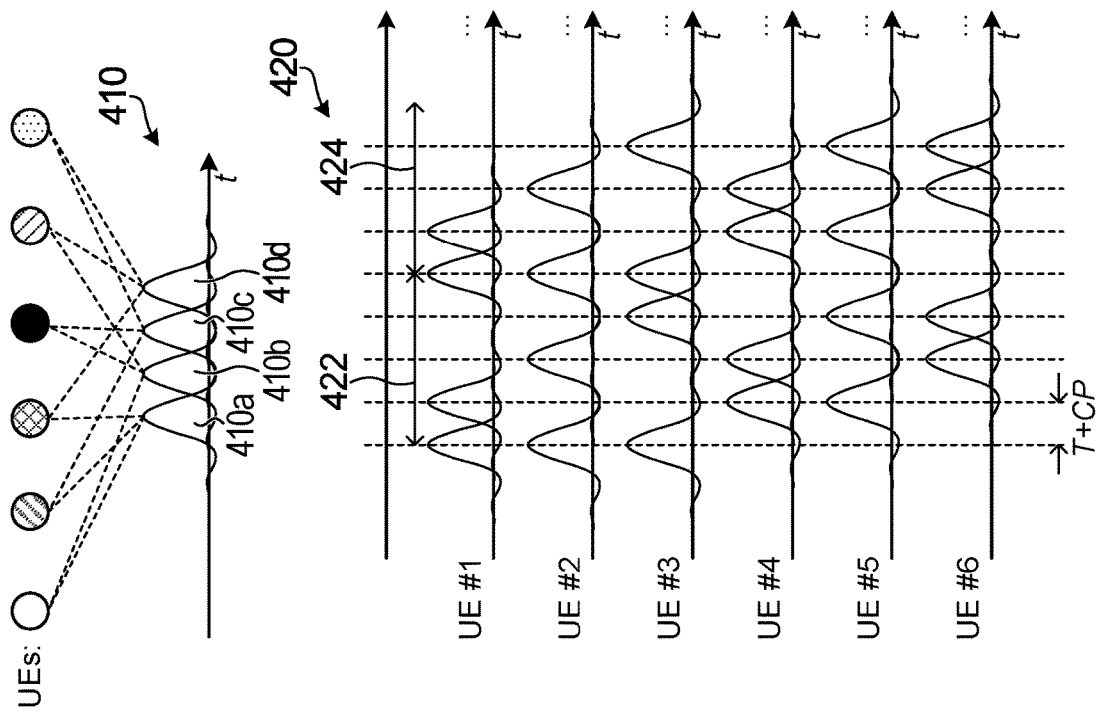
FIG. 4 illustrates a representation of a single-subcarrier pulse-shaped sparse transmission resource allocated for up to six UEs according to an aspect of the present disclosure.
Figure 3:
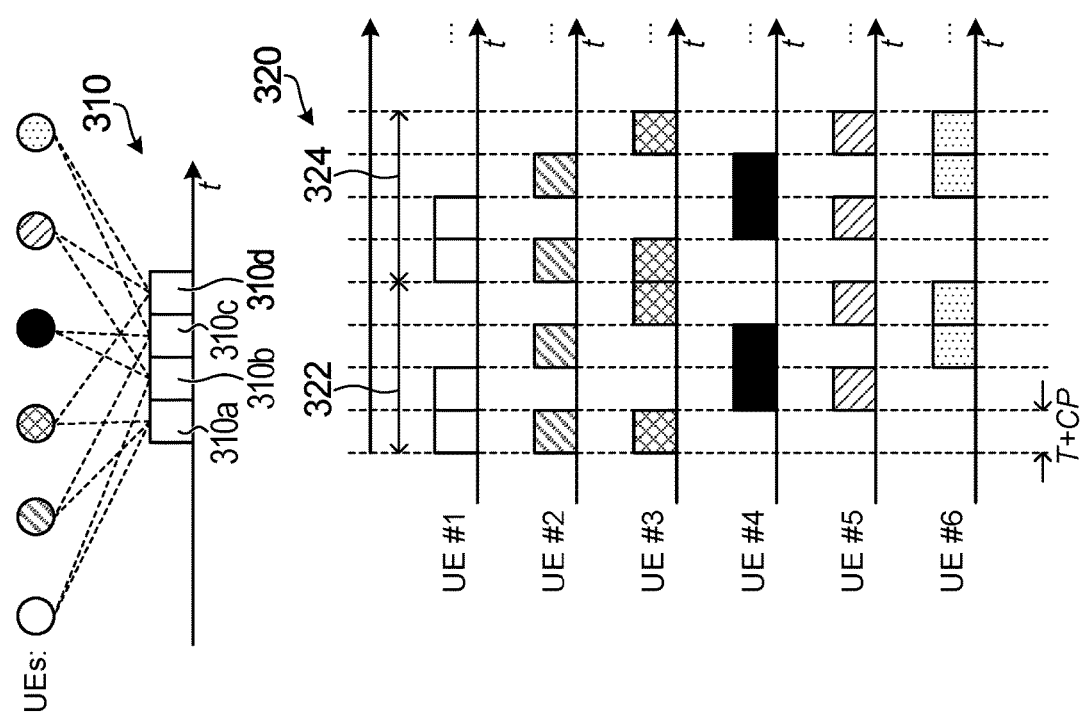
FIG. 3 illustrates a representation of a single-subcarrier cyclic prefix orthogonal frequency divisional multiple access (CP-OFDMA) sparse transmission resource allocated for up to six user equipment (UEs) according to an aspect of the present disclosure.

FIGS. 3 and 4 illustrate examples of how multiple UEs may implement a single-subcarrier sparse transmission using different combinations of time domain resources.

In a single-subcarrier sparse transmission, the transmitted symbols are sparse in time-domain, and only a single subcarrier is used in frequency domain. FIG. 3 illustrates an example of a single-subcarrier cyclic prefix orthogonal divisional multiple access (CP-OFDMA) sparse transmission. A sparse time domain resource 310 is shown to include a maximum four resource elements 310a, 310b, 310c, 310d in the particular example. A sparse transmission may utilize more than one of these sparse time domain resources 310 in succession. In some embodiments, these resource elements are orthogonal frequency divisional multiplexed symbols. However, that does not exclude them from being other time-frequency resource elements. FIG. 3 illustrates two sparse time domain resources 322, 324 in series that is shared by six UEs in this particular example. Each of the four elements 310a, 310b, 310c, 310d has a length T plus a cyclic prefix (CP). Six UEs UE #1, UE #2, UE #3, UE #4, UE #5, UE #6 are shown sharing the same time domain resource 310 by using different combinations of two resource elements of the total of four resource elements 310a, 310b, 310c, 310d. UE #1 uses the first 310a and second 310b elements. UE #2 uses the first 310a and third 310c elements. UE #3 uses the first 310a and fourth 310d elements. UE #4 uses the second 310b and third 310c elements. UE #5 uses the second 310b and fourth 310d elements. UE #6 uses the third 310c and fourth 310d elements.

FIG. 4 illustrates an example of a single-subcarrier pulse-shaped sparse transmission. In FIG. 4, a sparse time domain resource 410 is shown to include a maximum of four pulses 410a, 410b, 410c, 410d. A sparse transmission may utilize more than one of these sparse time domain resources 410 in succession. FIG. 4 illustrates two sparse time domain resources 422, 424 in series that can be shared by six UEs in this particular example. The period of time between successive pulses is T. Six UEs UE #1, UE #2, UE #3, UE #4, UE #5, UE #6 are shown sharing the same time domain resource 410 by using different combinations of two pulses of the total of four pulses 410a, 410b, 410c, 410d. The arrangement of the UEs and pulses is the same as the arrangement of UEs and resource elements in FIG. 3.

It is to be understood that the number of UEs to be assigned to a time domain resource is dependent on the number of elements in the time domain resource, the number of elements used by any given user as well as other additional factors. FIGS. 3 and 4 illustrating six UEs and four elements per time domain resource are merely by way of example.

Figure 5:
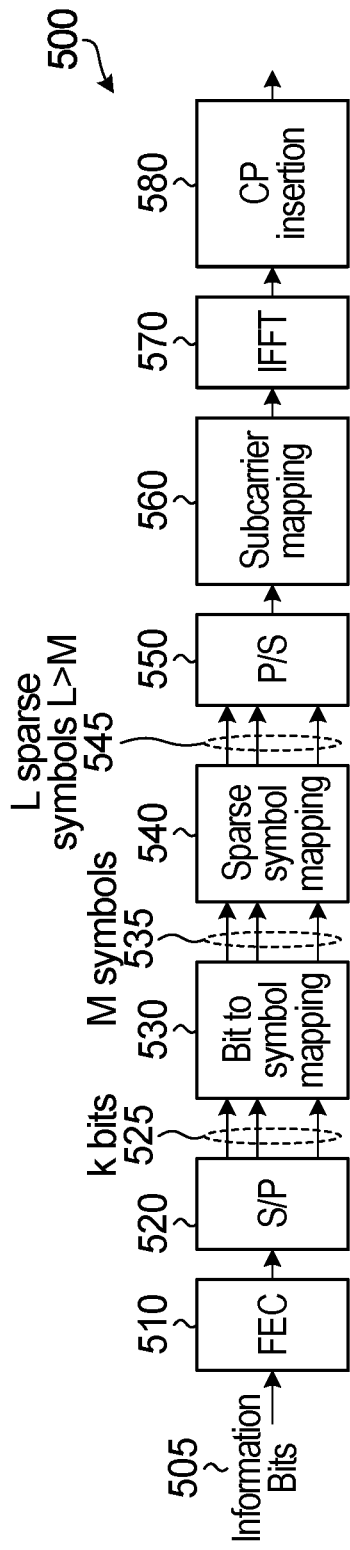
FIG. 5 is a block diagram of an example transmitter for use with single-subcarrier CP-OFDMA sparse transmission.
Figure 6:
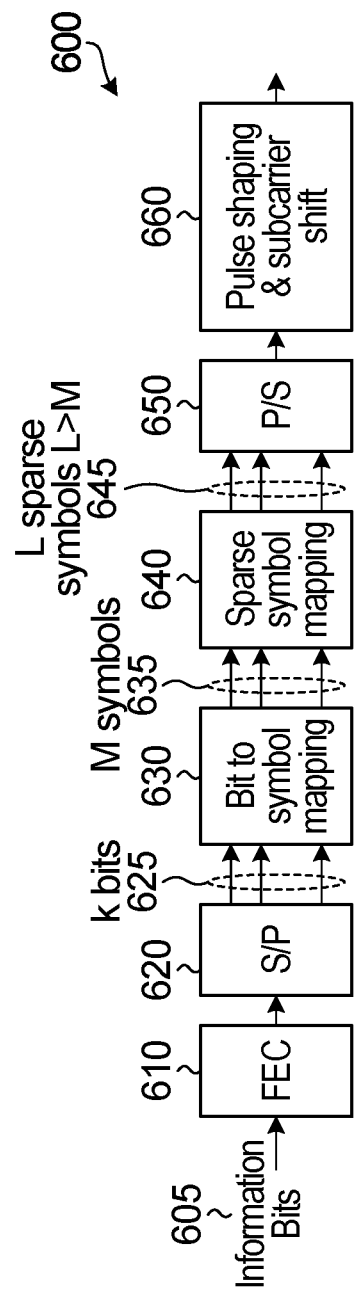
FIG. 6 is a block diagram of an example transmitter for use with single-subcarrier pulse-shaped sparse transmission.

FIGS. 5 and 6 are examples of transmitter paths that may be used for transmitting a single-carrier sparse transmission of the types shown in FIGS. 3 and 4, respectively. The transmitter paths in FIGS. 5 and 6 may be, for example, part of UEs that are each using a different sparse symbol mapping as shown in FIGS. 3 and 4. An input provided to each transmitter path includes bits to be transmitted by the UE at a given time. Outputs of the transmitter path may then be transmitted via one or more antennas of the UE.

FIG. 5 is a block diagram of an example transmitter path 500 for transmitting a single-subcarrier CP-OFDMA sparse transmission. Information bits 505 are input to a forward error correction (FEC) encoder 510. Bits output from the FEC 510 are input to a serial-to-parallel (S/P) converter 520. k bits 525 that are output in parallel from the S/P converter 520 are input to a bit to symbol mapping function 530. For example, M symbols 535 that are output from the bit to symbol mapping function 530 can be M single-dimensional symbols e.g. quadrature-amplitude modulation (QAM) symbols, or one M-dimensional symbol or a number of multi-dimensional and a number of single-dimensional symbols, or a combination thereof. The M symbols 535 are input to a sparse mapping function 540. L sparse symbols 545, where L>M, that are output from the sparse mapping function 540 include the M symbols 535 together with L−M zero symbols. The exact locations of the M symbols 535 within the L sparse symbols 545 are determined by the sparse symbol mapping 540. The L sparse symbols 545 are input to a parallel to serial (P/S) converter 550. An output from the P/S converter 550 is input to a subcarrier mapper 560. An output from the subcarrier mapper 560 is input to an inverse fast Fourier transform (IFFT) 570. An output from the IFFT 570 is provided to a function 580 that adds a cyclic prefix (CP insertion).

FIG. 6 is a block diagram of an example transmitter path 600 for transmitting a single-subcarrier pulse shaped sparse transmission. Information bits 605 are input to a FEC encoder 610. Bits output from the FEC 610 are input to a S/P converter 620. k bits 625 that are output in parallel from the S/P converter 620 are input to a bit to symbol mapping function 630. For example, M symbols 635 that are output from the bit to symbol mapping function 630 can be M single-dimensional symbols e.g. quadrature-amplitude modulation (QAM) symbols, or one M-dimensional symbol or a number of multi-dimensional and a number of single-dimensional symbols, or a combination thereof. The M symbols 635 are input to a sparse mapping function 640. L sparse symbols 645, where L>M, that are output from the sparse mapping function 640 include the M symbols 635 together with L-M zero symbols. The exact locations of the M symbols 635 within the L sparse symbols 645 is determined by the sparse symbol mapping 640. The L sparse symbols 645 are input to a parallel to serial (P/S) converter 650. An output from the P/S converter 650 is input to a pulse shaping and subcarrier shift function 660. The FEC 610, S/P converter 620, bit to symbol mapping function 630, input to a sparse mapping function 640 and P/S converter 650 in FIG. 6 may be substantially the same as the FEC 510, S/P converter 520, bit to symbol mapping function 530, input to a sparse mapping function 540 and P/S converter 550 in FIG. 5.

A potential problem with time-domain sparsity is that it may increase the PAPR and/or cubic metric of a transmitted signal due to power variations caused by transmission of zero symbols in the time-domain.

A zero symbol, zero element, '0' symbol or nullity is a symbol with zero amplitude. Therefore, a zero symbol has zero power. The phase of the zero symbol (with zero amplitude) can be any value. A sequence of symbols is called sparse if it includes at least one zero symbol. In general, a sequence of modulated symbols may or may not be sparse. A sequence of symbols that does not include at least one zero symbol is non-sparse.

Sparse symbol sequence generation or sparsity in a sequence of symbols can be achieved in different ways. For example, sparse sequence generation can be done by introducing zero symbol(s) to a modulation block or by symbol to resource element (RE) mapping or by symbol scrambling (e.g. with a scrambling sequence having one or more zero symbols); or by spreading with a spreading sequence that includes one or more zero symbol(s); or by puncturing a sequence of modulated symbols; or a combination of one or more of these functions. In some scenarios, a sparse density or sparse level (p) or sparsity factor of a sparse sequence of symbols may be defined as a ratio between a number of non-zero symbols to a total number of symbols in the sequence of symbols.

A sparse pattern or sparsity pattern of length N may be specified by a sequence of 0s (zeros) and 1s (ones) in which 0s indicate the zero symbol(s) and 1s indicate the non-zero symbol(s). For example, sparse pattern 1100 of length 4 (i.e., N=4) corresponds to a sequence of symbols where first two symbols are non-zero and second two symbols are zero symbols. The non-zero symbols may be modulated symbols or otherwise. The sparse pattern 1010 is a length 4 sparse pattern where odd and even numbered symbols alternate between zero and non-zero symbols starting with a non-zero symbol. The pattern 0101 is a length 4 sparse pattern where every other symbol alternates between zero and non-zero symbols starting with a zero symbol. The sparse patterns 1100, 1010, 0101 are different sparse patterns that have the same sparse density/level $\rho=1/2$, where the sparse density is defined as the ratio of the number of non-zero elements to the total number of element in a pattern. Based on this definition of sparse density, sparsity would be related to sparse density in an inverse relationship, i.e. a lower sparsity would be a higher sparse density value and vice versa. The sparse pattern 1110 has a lower sparsity (with sparse density $\rho=3/4$) compared to sparse patterns 1100/1010/0101 each having a sparse density $\rho=1/2$ and to sparse pattern 0010 that has sparse density $\rho=1/4$. Sparse pattern 1111 corresponds to a non-sparse symbol sequence (with sparse density $\rho=1$) and sparse pattern 0000 corresponds to a full symbol sequence (with sparse density $\rho=0$). A permutation of a sequence of symbols (a change in the order of symbols) corresponds to a different sparse pattern. A permutation is a linear transformation and can be achieved by a multiplication of a sequence of symbols with a permutation matrix, where the permutation matrix is a square matrix of 1s and 0s which has exactly one entry of 1 in each row and exactly one entry of 1 in each column with the rest of entries being all 0s.

Aspects of the present disclosure modify sets of sparse mapped symbols, in the time domain, in a transmission path before transmission. The modification of the sets of sparse mapped symbols may be implemented in the form of a linear transform of the sets of sparse mapped symbols. The linear transform has the effect of reducing the sparsity of sets of spare mapped symbols. The linear transform might not reduce that sparsity of each element of the set of sparse mapped symbols, as long as overall the sparsity for the transformed set of symbols will have a reduced sparsity as compared to if the transform has not been performed. At a receiver that receives a transmission or a superposition of multiple transmissions, an inverse of the linear transform can be first applied to the transformed sparse mapped transmission(s) or the received superposition of them and then multi-user detection is performed in the sparse domain. The linear transform may be implemented in a mathematical sense as a linear block transform or a set of linear sub-block transforms. In some embodiments, the linear block transform may be a unitary transform. In some embodiments, the linear sub-block transforms are applied to sub-blocks of a sparse mapped transmission. The linear sub-block transforms can be represented in a mathematical sense as a linear block diagonal transform.

In some embodiments, the linear transformation might not change the sparsity or sparse density/level. In other words, sparsity or sparse density/level remains the same or is even increased. For example, the amplitude and/or phase of a sparse symbol sequence may be modified by a transformation so that a resulting symbol sequence has improved PAPR and/or cubic metric compared to the original sequence of symbols, but the sparse pattern has not been modified. In another example, a sparse symbol sequence may be permuted (the order of symbols has been changed) that has the effect of improving PAPR and/or cubic metric without changing the sparse density of the original symbol sequence. In another example, a sparse symbol sequence may be linearly transformed so that the sparse pattern is modified without changing the sparse density.

In any of the embodiments of this disclosure, a linear transform refers to a transform $T(\cdot)$ that satisfies the following two conditions: (1) $T(v+w)=T(v)+T(w)$ for any two inputs v and w; and (2) $T(a\cdot v)=a\cdot T(v)$ for any input v and any scalar value a. When the input and the output of the linear transform are vectors (or groups) of symbols, e.g. vectors (or groups) of complex values, an example of the linear transform is one which is realized by matrix multiplication, in which case the transform is characterized by a matrix. In some embodiments, the linear transform is performed by some form of electronic circuitry that is equivalent to a function performed as matrix multiplication, but no actual matrix multiplying takes place. In an alternative implementation of a linear transform, for a linear transform which takes a group of symbols as its input and transforms them into a group symbols as its output, each of the symbols in the group of output symbols is obtained by applying respective amplifications and/or phase shifts to one or more symbols from the group of input symbols and summing the amplified and/or phase shifted symbols. The operation of applying respective amplifications and/or phase shifts to one or more symbols and summing the amplified and/or phase shifted symbols is sometimes called "linear combination" of the one or more symbols.

In some embodiments, one or more sets of linear transforms may be predefined in a communications standard specification. In some embodiments, a particular linear transform of the set of linear transforms may be signaled by the network to the UE using higher-layer signaling. The higher layer signal may include radio resource control (RRC) signaling or using a media access control (MAC) control element (CE).

The linear transform may be implemented in a mathematical sense in the form of a unitary matrix. Examples of a unitary matrix are a discrete Fourier transform (DFT) matrix, an inverse discrete Fourier transform (IDFT) matrix, or a Hadamard matrix (also known as Walsh-Hadamard matrix).

Figure 7:
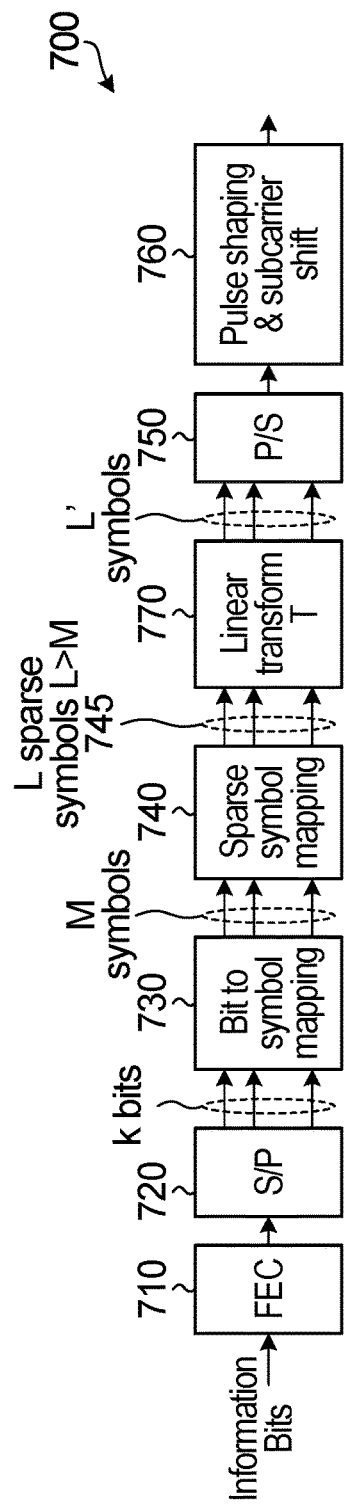
FIG. 7 is a block diagram of an example transmitter for use with single-subcarrier pulse-shaped sparse transmission according to a first embodiment of the present disclosure.

A first example of applying a linear transform to a single-subcarrier sparse mapped signal is illustrated in the example transmitter path 700 in FIG. 7. In the example, a linear transform is applied to each sparse mapped block in a transmission that includes multiple blocks. FIG. 7 includes the same type of elements shown in the transmitter path 600 of FIG. 6, plus some additional functionality. In FIG. 7 these elements are identified as FEC 710, S/P converter 720, bit to symbol function 730, sparse symbol mapping function 740, P/S converter 750 and pulse shaping and subcarrier shift function 760. FIG. 7 also includes a linear transform 770 located between the sparse symbol mapping function 740 and the P/S converter 750. The output of the linear transform 770 is labelled as L' symbols. In some embodiments, L' is the same number of symbols L as are output of the sparse symbol mapping function 740. In some embodiments, L' is a different number of symbols L as are output of the sparse symbol mapping function 740.

Figure 8:
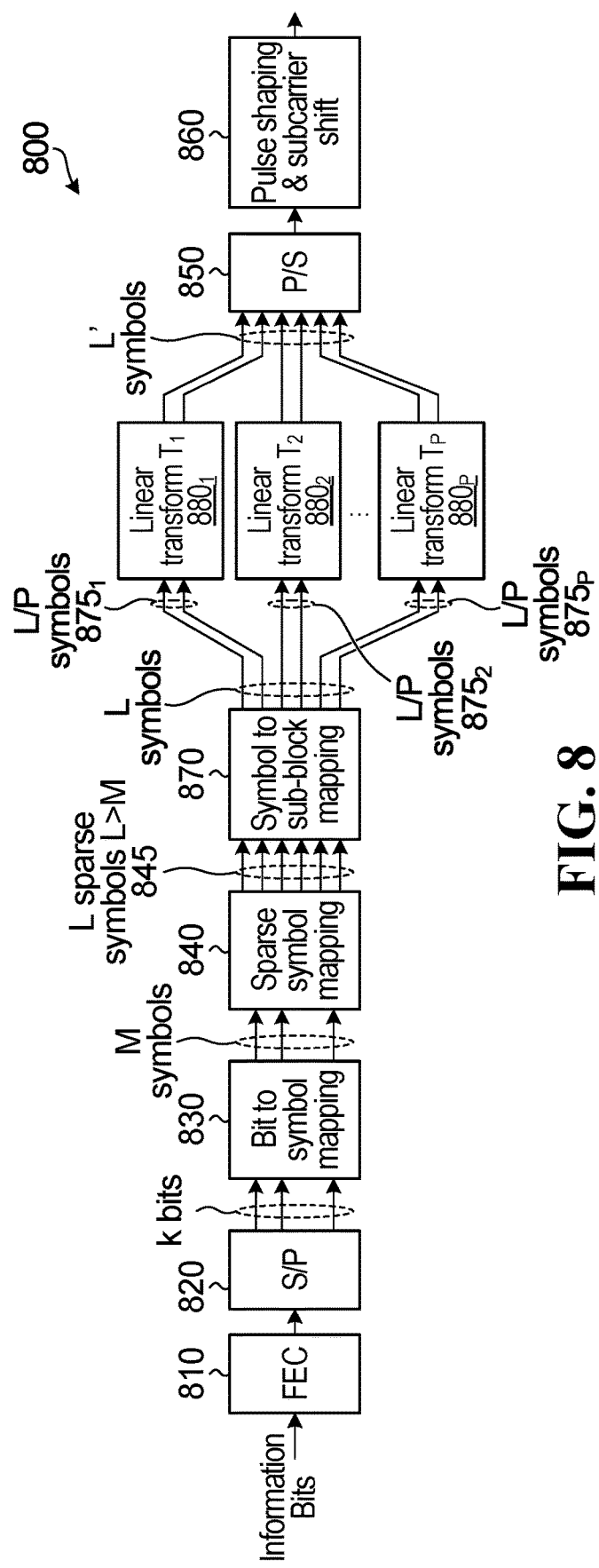
FIG. 8 is a block diagram of an example transmitter for use with single-subcarrier pulse-shaped sparse transmission according to a second embodiment of the present disclosure.

A second example is shown in FIG. 8 that illustrates applying a linear transform in the form of multiple linear transforms to sub-blocks of a sparse mapped block of the transmission signal in a transmitter path 800. FIG. 8 is shown to include FEC 810, S/P converter 820, bit to symbol function 830, sparse symbol mapping function 840, P/S converter 850 and pulse shaping and subcarrier shift function 860. A symbol to sub-block mapping function 870 and multiple linear transforms $880_1$, $880_2$, ... $880_P$ are included between the sparse symbol mapping function 840 and the P/S converter 850. The output of the sparse symbol mapping function 840 is provided to the symbol to sub-block mapping function 870, which partitions the sparse mapped block of L symbols into sub-blocks having same sizes or having different sizes. The sub-blocks may have different sizes if a number of L symbols is not evenly divisible by a number of sub-blocks P. In FIG. 8, the symbol to sub-block mapping function 870 illustrates the L sparse symbols 845 being divided evenly into P groups $875_1$, $875_2$, ... $875_P$ of L/P symbols each. Each group of L/P symbols is then provided to a respective one of P linear transforms $880_1$, $880_2$, ... $880_P$. Each of the P linear transforms $880_1$, $880_2$, ... $880_P$ then applies an output to the P/S converter 850. The output of the P linear transforms $880_1$, $880_2$, ... $880_P$ is collectively labelled as L' symbols. In some embodiments, L' is the same number of symbols L as are output of the sparse symbol mapping function 840. In some embodiments, L' is a different number of symbols L as are output of the sparse symbol mapping function 840. The symbol to sub-block mapping function 870 and the multiple linear transforms $880_1$, $880_2$, ... $880_P$ can also be represented in the form of a block transformation using a block-diagonal matrix.

Figure 9A:
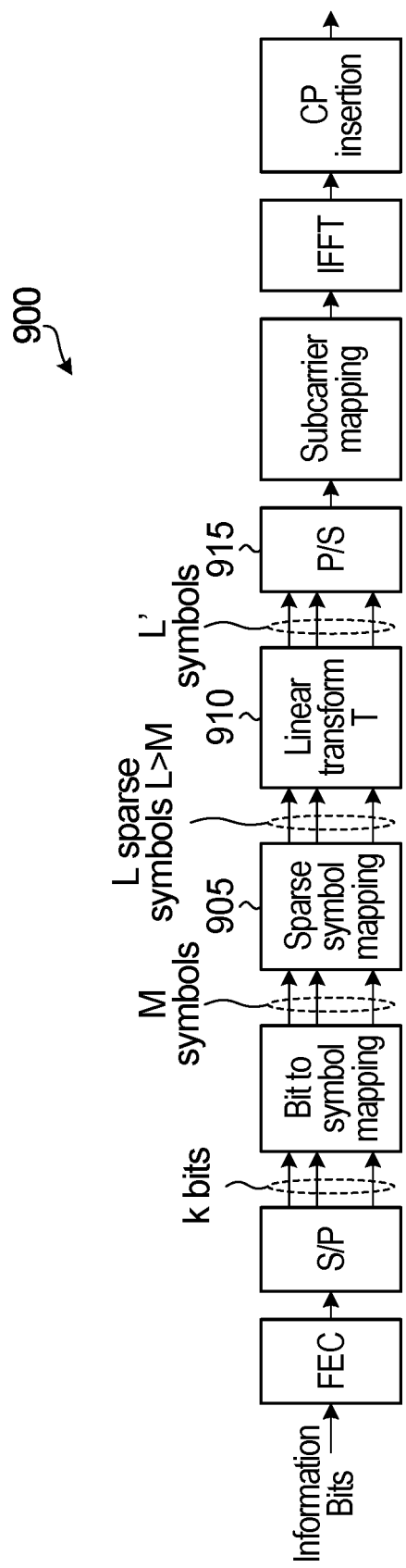
FIGS. 9A and 9B are block diagrams of example transmitters for use with single-subcarrier CP-OFDMA sparse transmission according to a additional embodiments of the present disclosure.
Figure 9B:
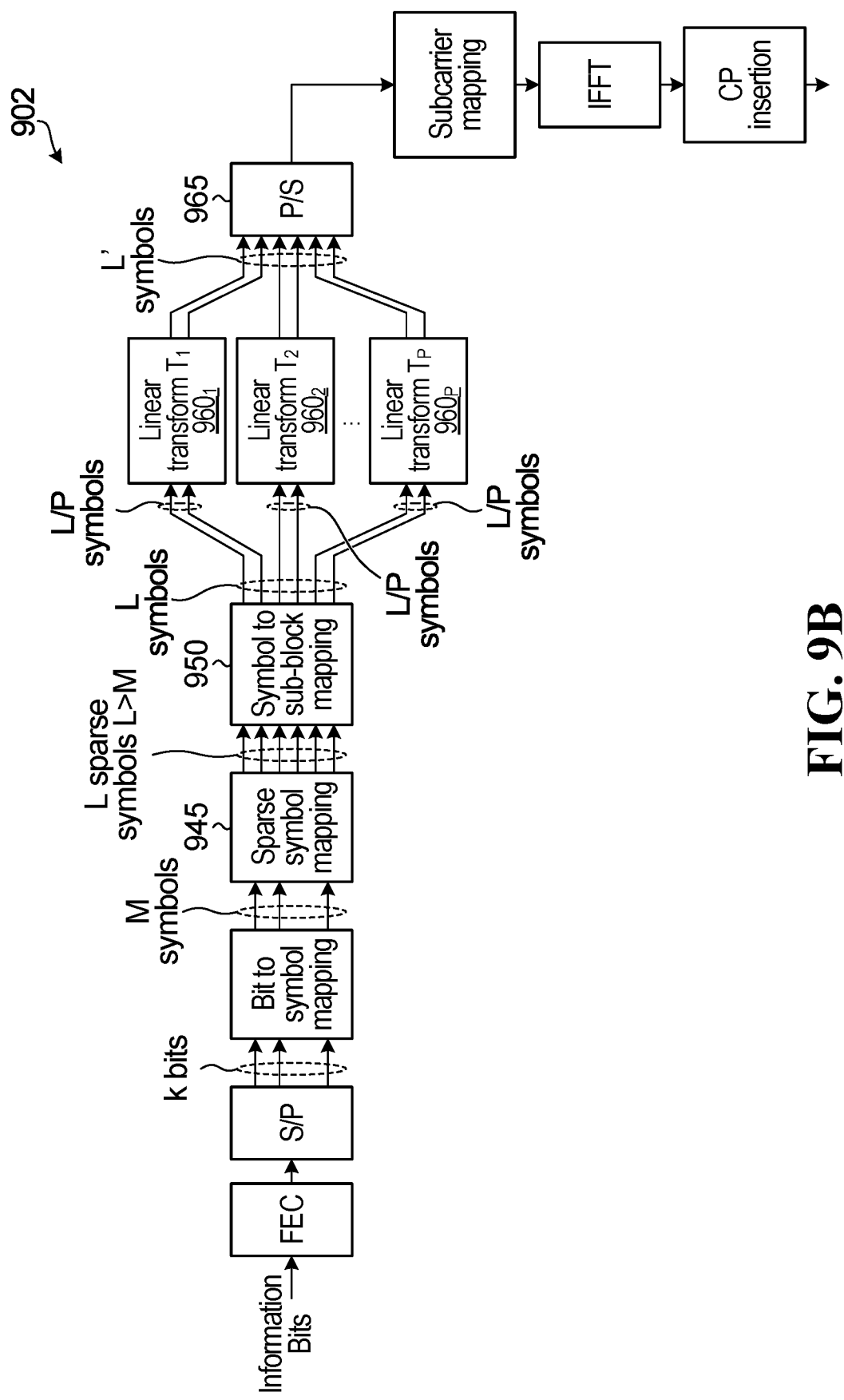

FIG. 9A includes transmitter 900, which is similar to transmitter 500 in FIG. 5, but with a linear transform 910 included between a sparse symbol mapping function 905 and a P/S converter 915. FIG. 9B includes transmitter 902, which is similar to transmitter 500 in FIG. 5, but with a symbol to sub-block mapping function 950 and multiple linear transforms $960_1$, $960_2$, ... $960_P$ added between the sparse symbol mapping function 945 and the P/S converter 965. The linear transform in FIG. 9A and the sub-block mapping function and multiple linear transforms in FIG. 9B operate in a similar manner to the same named elements in FIGS. 7 and 8, respectively.

In some embodiments, a block-wise transformation at the transmitter side, in conjunction with an inverse transformation at the receiver side to transform the signal back to the original sparse mapped domain, reduces PAPR and/or cubic metric while keeping the benefit of sparse transmission without resulting in significant deterioration of performance.

In some embodiments pertaining to using a sub-block transform, depending on a constellation size and/or modulation or codebook shape, the sub-block transform may provide a better PAPR than the block-wise transform, because in some situations a block-wise transform mixes all the symbols within a given sparse mapped block of the transmission signal, which may in turn have a negative impact on PAPR and/or cubic metric.

Further aspects of the present disclosure include a phase shift in addition to the linear transform described above with regard to FIGS. 7, 8, 9A and 9B. Some embodiments include applying an element-wise phase shift to non-zero constellation points prior to the linear transform. Element-wise is intended here to mean one or more of the L sparse symbols can be phase shifted on a per symbol basis. Some embodiments include applying a block-wise phase shift to each sparse mapped block in the transmission after the linear transformation. Therefore, different phase shifts can be applied over consecutive sparse mapped blocks of the transmission in the time-domain.

In some embodiments, one or more sets of phase shift values may be predefined in a communications standard specification. In some embodiments, a particular phase shift value may be signaled by the network to the UE using higher-layer signaling. The higher layer signal may include RRC signaling or MAC CE.

Figure 10A:
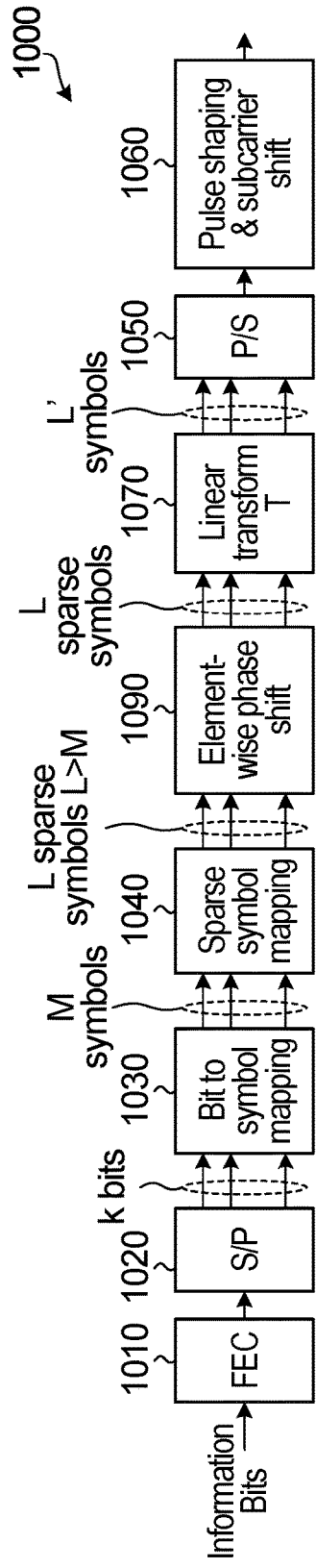
FIGS. 10A and 10B are block diagrams of an example transmitter for use with single-subcarrier pulse-shaped sparse transmission according to additional embodiments of the present disclosure.

FIG. 10A illustrates an example of a phase shift applied to each non-zero element in a block of sparse symbols before linear transformation. FIG. 10A includes transmitter path 1000, which is similar to transmitter path 700 shown in FIG. 7. In FIG. 10A the elements in the transmitter path 1000 are identified as FEC 1010, S/P converter 1020, bit to symbol function 1030, sparse symbol mapping function 1040, linear transform 1070, P/S converter 1050 and pulse shaping and subcarrier shift 1060. However, an element-wise phase shift function 1090 is added between the sparse symbol mapping function 1040 and the linear transform 1070. In some embodiments, the phase shift can be applied to only a subset of non-zero elements as opposed to all non-zero elements. In some embodiments, the same phase shift can be applied to all of the non-zero elements. In some embodiments, different phase shifts can be applied to some or all of the non-zero elements. FIG. 10A illustrates the phase shift applied as a block transformation.

Figure 10B:
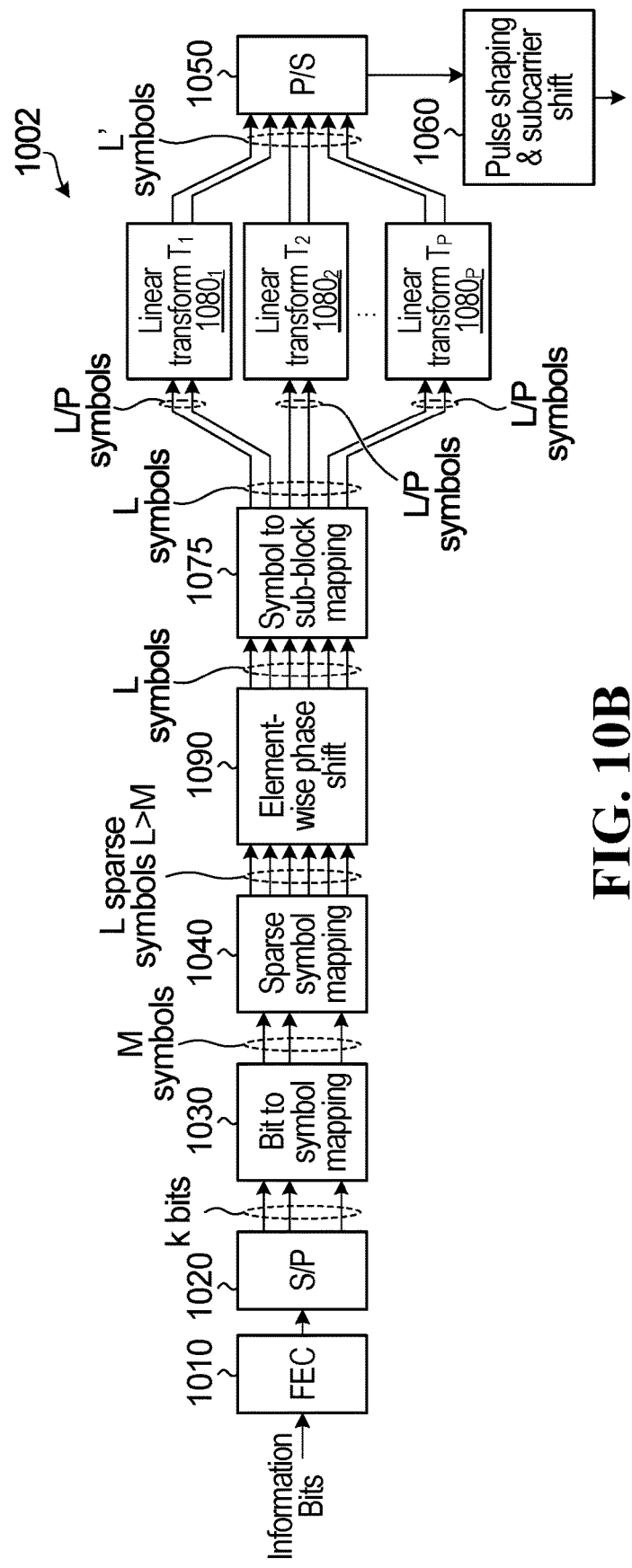

FIG. 10B illustrates the phase shift applied as a sub-block transformation consistent with the transmitter in FIG. 8. FIG. 10B includes transmitter path 1002, which is similar to transmitter path 800 shown in FIG. 8. In FIG. 10B the elements in transmitter path 1002 are identified as FEC 1010, S/P converter 1020, bit to symbol function 1020, sparse symbol mapping function 1030, sparse symbol mapping function 1040, symbol to sub-block mapping function 1075, P linear transforms $1080_1$, $1080_2$, ... $1080_P$, P/S converter 1050 and pulse shaping and subcarrier shift function 1060. However, an element-wise phase shift function 1090 is added between the sparse symbol mapping function 1040 and the symbol to sub-block mapping function 1075.

Figure 10C:
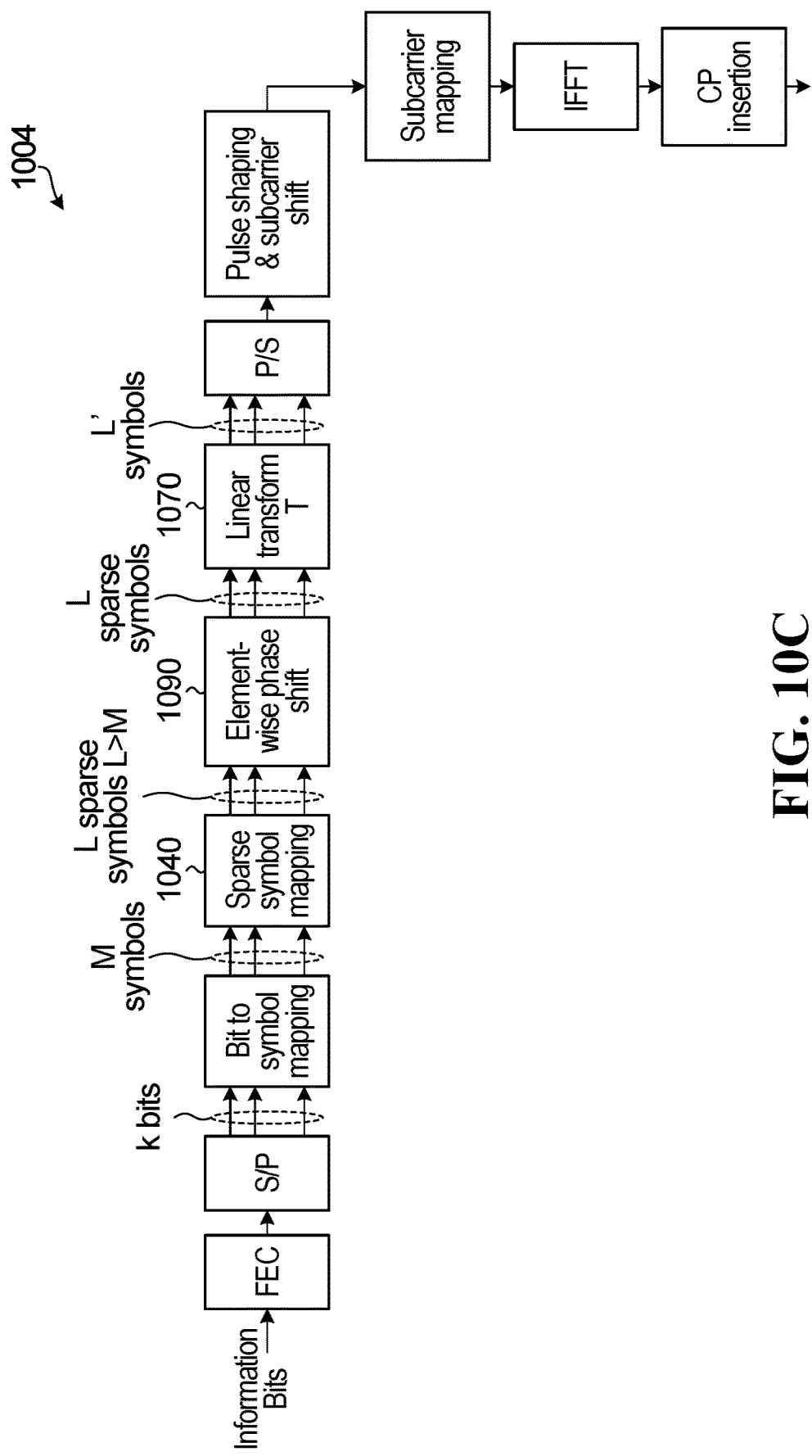
FIGS. 10C and 10D are block diagrams of an example transmitter for use with single-subcarrier CP-OFDMA sparse transmission according to additional embodiments of the present disclosure.
Figure 10D:
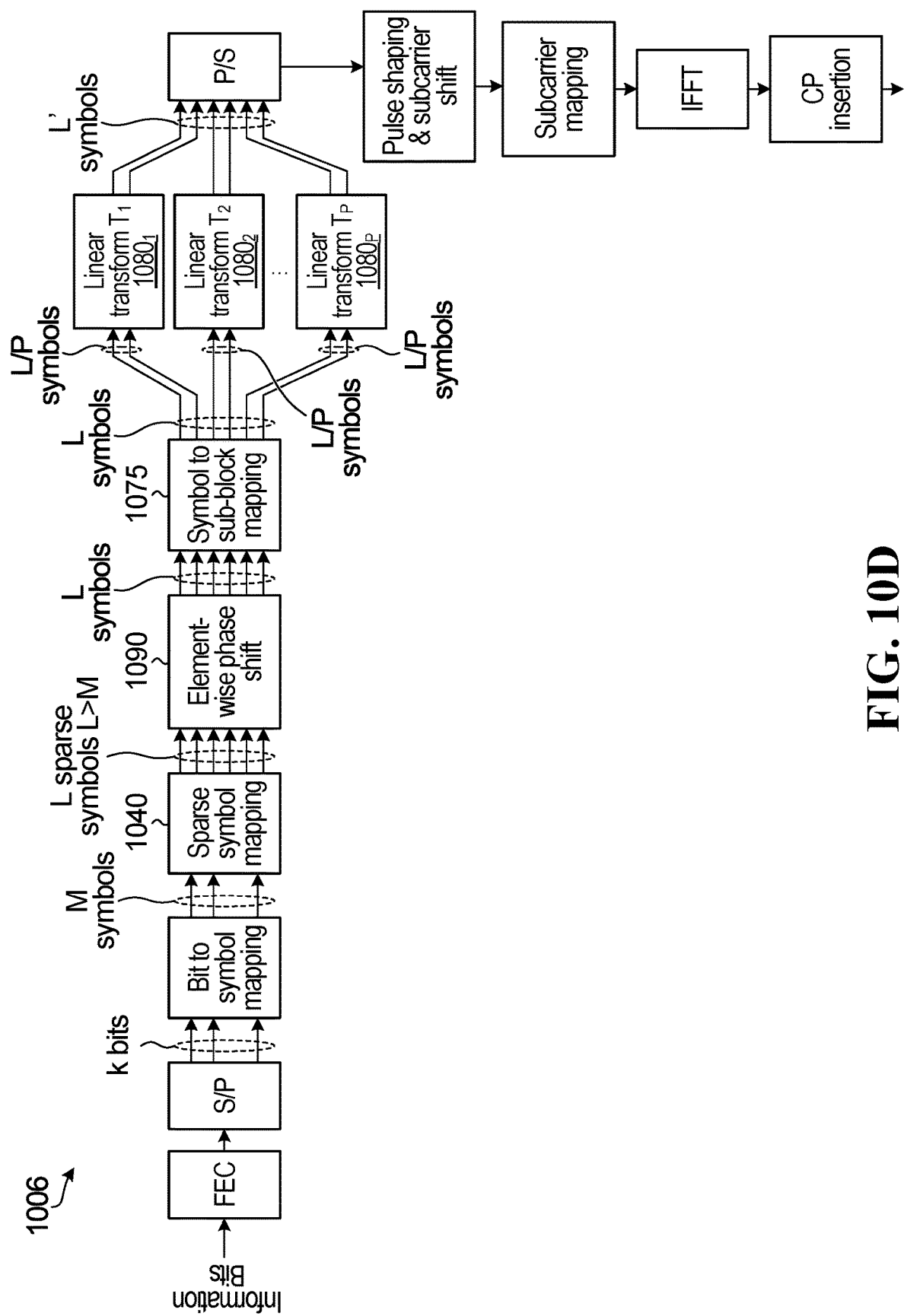

The transmitter path 1004 in FIG. 10C is a similar representation to the transmitter path 900 in FIG. 9A, but with an element-wise phase shift function 1090 added between the sparse symbol mapping function 1040 and the linear transform 1070 of transmitter path 1025. The transmitter path 1006 in FIG. 10D is a similar representation to the transmitter path 902 FIG. 9B, but with an element-wise phase shift function 1090 added between the sparse symbol mapping function 1040 and the symbol to sub-block mapping function 1075 of transmitter path 1035. The linear transform in FIG. 10C and the sub-block mapping and multiple linear transforms in FIG. 10D operate in a similar manner to the same named elements in FIGS. 10A and 10B, respectively.

Figure 11A:
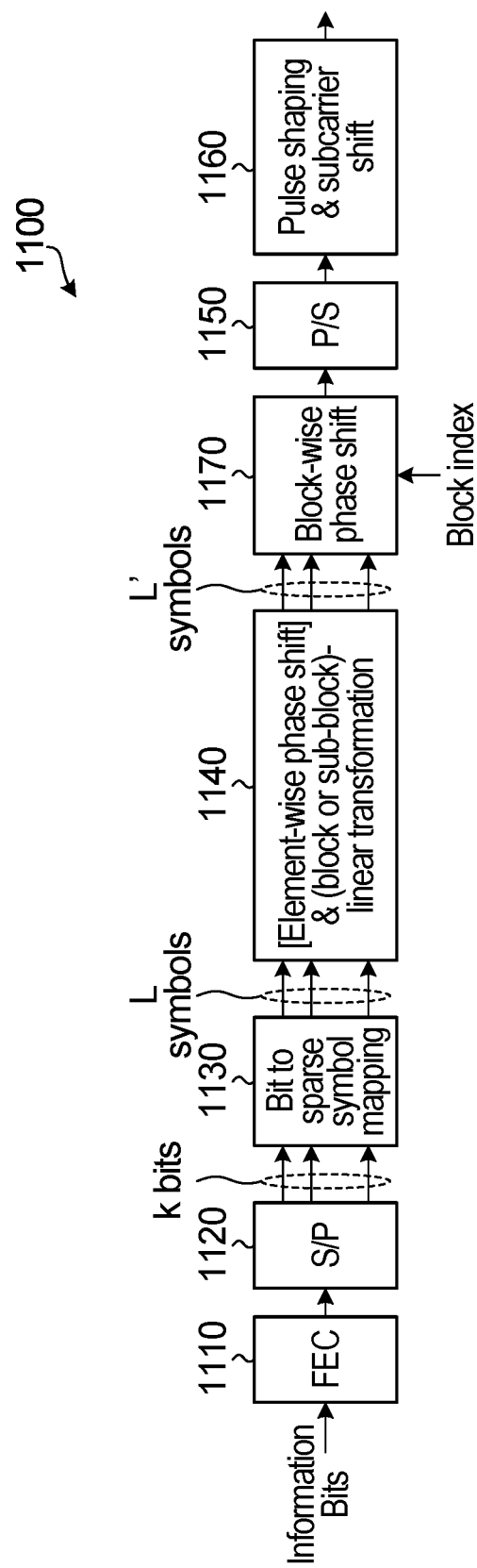
FIG. 11A is a block diagram of an example transmitter for use with single-subcarrier pulse-shaped sparse transmission according to embodiments of the present disclosure.

FIG. 11A illustrates an example of a phase shift applied to each sparse block of the transmission after the linear transformation. FIG. 11A shows a transmitter path 1100 that includes FEC 1110, S/P converter 1120, bit to sparse symbol mapping function 1130, P/S converter 1150 and pulse shaping and subcarrier shift function 1160. FIG. 11A may include an element-wise phase shift function, such as 1090 in FIG. 10A, 10B, 10C or 10D. FIG. 11A may include either a block linear transform implemented by linear transform 1070 as shown in FIG. 10A or 10C or a sub-block transform implemented by symbol to sub-block mapping function 1075 and P linear transforms $1080_1$, $1080_2$, ... $1080_P$ as shown in FIGS. 10B and 10D. These various options are included in block 1140 of FIG. 11A. In addition to these various options, the transmitter includes a block-wise phase shift function 1170 between the block 1140 and the P/S converter 1150. The block-wise phase shift can be applied to every sparse mapped block or a selected set of sparse mapped blocks in a series of blocks that make up the sparse mapped transmission. For example, the phase shift can be applied to only a subset of transformed sparse mapped blocks in time, e.g. all the symbols in a block-wise manner are phase shifted in every other sparse mapped block. A block index input 1175 is shown in FIG. 11A that provides an indication of which sparse mapped blocks are to be block-wise shifted.

Figure 11B:
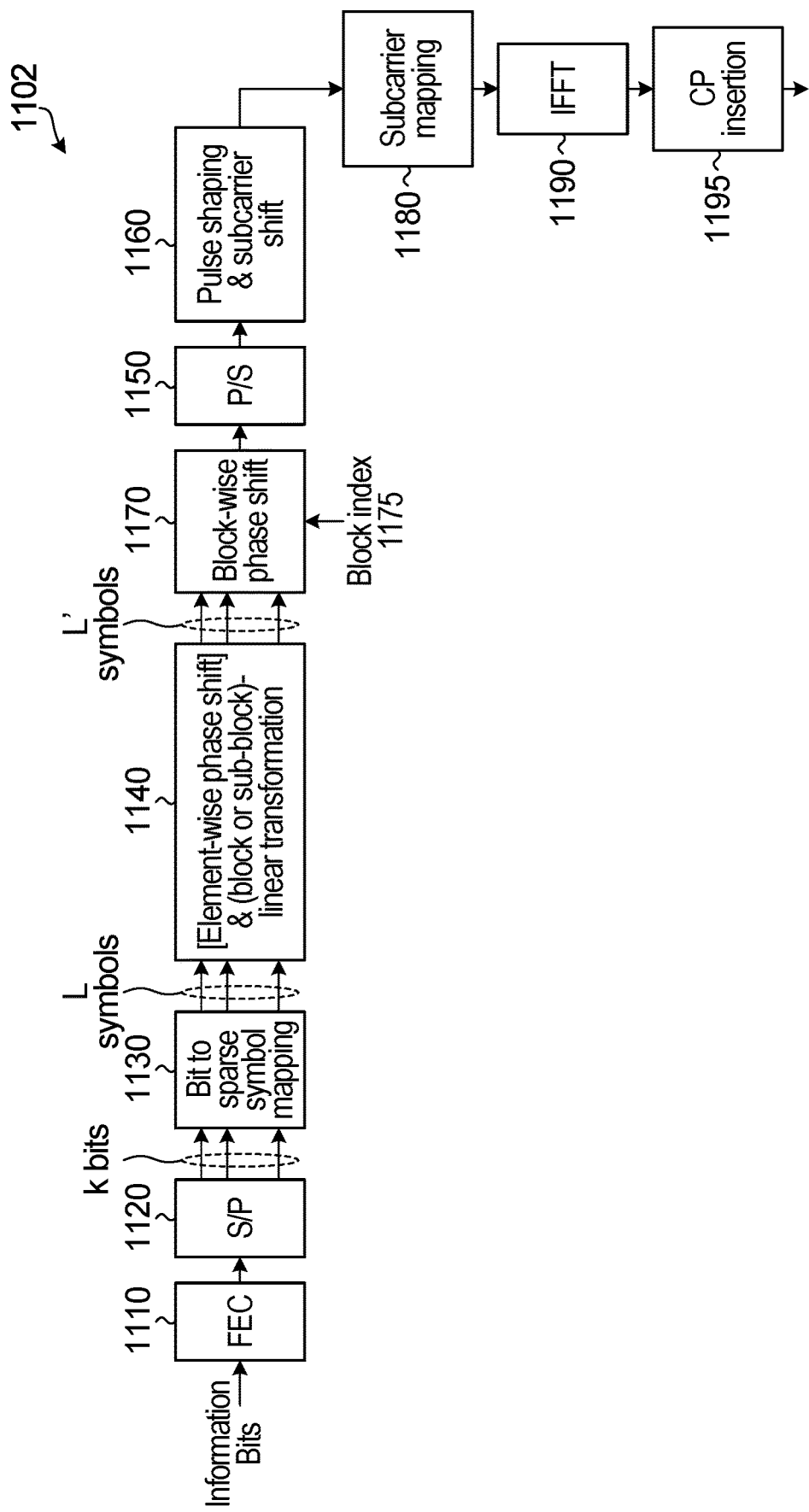
FIG. 11B is a block diagram of an example transmitter for use with single-subcarrier CP-OFDMA sparse transmission according to embodiments of the present disclosure.

FIG. 11B illustrates an example of a phase shift applied to each sparse block of the transmission after the linear transformation. FIG. 11B shows a transmitter path 1102 that includes FEC 1110, S/P converter 1120, bit to sparse symbol mapping function 1130, P/S converter 1150, subcarrier mapper 1180, IFFT 1190, and a function 1195 that adds a CP insertion. FIG. 11B may include an element-wise phase shift function, such as 1090 in FIG. 10A, 10B, 10C or 10D. FIG. 11B may include either a block linear transform implemented by linear transform 1070 as shown in FIG. 10A or 10C or a sub-block transform implemented by symbol to sub-block mapping function 1075 and P linear transforms $1080_1, 1080_2, \ldots 1080_P$ as shown in FIGS. 10B and 10D. These various options are included in block 1140 of FIG. 11B. In addition to these various options, the transmitter includes a block-wise phase shift function 1170 between the block 1140 and the P/S converter 1150. The block-wise phase shift can be applied to every sparse mapped block or a selected set of sparse mapped blocks in a series of blocks that make up the sparse mapped transmission. A block index input 1175 is shown in FIG. 11B that provides an indication of which sparse mapped blocks are to be block-wise shifted.

In some embodiments, the additional phase shift included via the element-wise phase shift or the block-wise phase shift may reduce PAPR and/or cubic metric.

Further aspects of the present disclosure are directed to the selection of the linear transform, either block or sub-block version, to be used in a transmitter. The selection would of course affect a transform used at the receiver as well.

In some embodiments, the linear transform may be a fixed, predefined transform, which may be defined for example as one of a set of fixed, predefined transforms in a communications standard specification.

In some embodiments, the linear transform may be a modulation and coding scheme (MCS) specific transform. For example, for each MCS or each MCS range, a specific transform is used by a UE. The specific transform can be predefined in a communications standard specification and may be configured by higher layers, such as RRC or MAC-CE.

In some embodiments, the linear transform may be a sparsity-pattern-specific transform. For example, the sparsity-pattern-specific transform may be a one-to-one mapping in which for each sparsity pattern, a specific linear transform is used by the UE.

In another example, the sparsity-pattern-specific transform is a many-to-one mapping. For a group of sparsity patterns, a specific linear transform is used by the UE (e.g. if the number of sparsity patterns is larger than the number of transforms). An example of this is a group of sparsity patterns which provide a low PAPR and/or low cubic metric signal if used with the given linear transform.

The specific transform can be predefined in a communications standard specification or configured by higher layers, such as RRC or MAC-CE.

In some embodiments, the linear transform may be a UE-specific transform. For example, the UE-specific transform can be autonomously selected by the UE from a set of fixed, predefined transforms in a communications standard specification, or can be higher-layer configurable.

Further aspects of the present disclosure are directed to utilizing a linear transform and sparsity-pattern hopping pattern. In some embodiments, utilizing a linear transform and sparsity-pattern hopping pattern adds more flexibility to the system to select the linear transform according to different conditions so as to achieve a better PAPR and/or cubic metric. In some embodiments, defining a signature as a combination of a sparsity-pattern and a linear transform used by the UE, linear transform and sparsity-pattern hopping can be utilized to increase a signature pool size and improve inter-UE collision handling performance. In some embodiments, hopping can be implemented within the pairs of sparsity-pattern and linear transform that provide low PAPR and/or cubic metric. The pairs of sparsity-pattern and linear transform can be referred to as a hopping group.

Some embodiments of linear transform and sparsity pattern hopping involve the pairs of sparsity-pattern and transform being hopped together. In a particular example, hopping can be done within the pairs of sparsity-pattern and linear transform that provide low PAPR and/or cubic metric.

For a case of one-to-one mapping between linear transforms and sparsity-patterns, the linear transform hopping is done using the same hopping pattern as sparsity-pattern hopping.

For the case of many-to-one mapping of sparsity-patterns and linear transforms, there are at least two methods to implement the mapping. A first method involves the sparsity-pattern hopping occurring within the sparsity-patterns associated with a same linear transform, while keeping the linear transform fixed. A second method involves the sparsity-pattern hopping occurring across the sparsity-patterns associated with different linear transforms, while hopping occurs in the linear transforms as well.

When pairs of sparsity-pattern and linear transform are hopped together, this may result in increasing an effective signature pool size while keeping the PAPR and/or cubic metric low.

In some embodiments, linear transform hopping and sparsity pattern hopping are done independently.

When pairs of sparsity-pattern and transform are hopped independently, this may result in a larger effective signature pool size than when pairs of sparsity-pattern and linear transform are hopped together, at the expense of higher PAPR and/or cubic metric for some combinations of sparsity-pattern and linear transforms.

Several examples of receive paths for a receiver will now be described that are complementary to the transmitters described above. The receiver may be a base station and the receive paths shown in FIGS. 12-15 are processing a received signal that may include signals transmitted from one or more UEs. The base station receives the signals together at one or more antennas and the received signals are passed to a receive path. Different receive paths are shown in the non-limiting examples of FIGS. 12-15.

Figure 12:
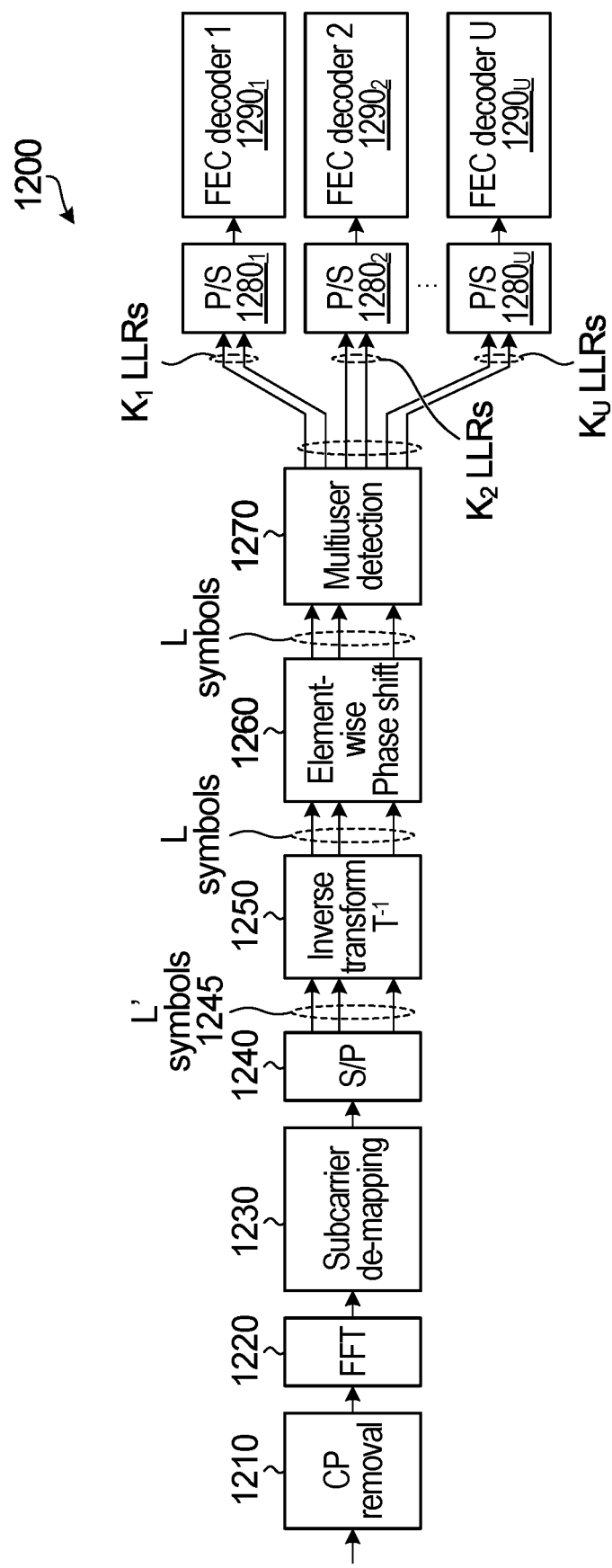
FIG. 12 is a block diagram of an example receiver for use with single-subcarrier CP-OFDMA sparse transmission according to a first embodiment of the present disclosure.

FIG. 12 is an example of a receive path 1200 that is complementary to a CP-OFDMA sparse transmission transmitter shown in FIG. 5, 9A, 9B, 10C, 10D or 11B. A received signal that may include transmissions from multiple different UEs over more than one channel is applied to a cyclic prefix (CP) removal function 1210. An output from the CP removal function 1210 is input to a fast Fourier transform (FFT) 1220. An output from the FFT 1220 is input to a subcarrier de-mapping function 1230. An output from the subcarrier de-mapping function 1230 is input to a S/P converter 1240. L' symbols 1245 that are output from the S/P converter 1240 are input to a transform 1250 that is the inverse transform used at the transmitter. FIG. 12 includes an element-wise phase shift function 1260 receiving an output of L symbols of the inverse transform 1250. The output of the inverse transform 1250 is labelled as L symbols indicating the same number of symbols output of the S/P 1240, but subsequently transformed. The element-wise phase shift function 1260 outputs to a multi-user detection function 1270. The element-wise phase shift function 1260 is shown with a dashed line, indicating that the function is optional. If it is not included, the output of the inverse transform 1250 would be provided to the multi-user detection function 1270. The multi-user detection function 1270 is configured to be able to distinguish the components specific to each user and then outputs user specific signal components, $K_i$ LLRs i=1 to U, to respective P/S converters 1280$_1$, 1280$_2$, ... 1280$_U$, where $K_i$ is the number of FEC coded bits of corresponding to transmitter #i. The LLR values are log-likelihood ratio values that can be used by the FEC decoders to determine the information bits of the respective transmitters. An output of each P/S converter 1280$_1$, 1280$_2$, ... 1280$_U$ is provided to a respective FEC decoder 1290$_1$, 1290$_2$, ... 1290$_U$. Outputs of the FEC decoders 1290$_1$, 1290$_2$, ... 1290$_U$ are information bits transmitted by respective UEs.

Figure 13:
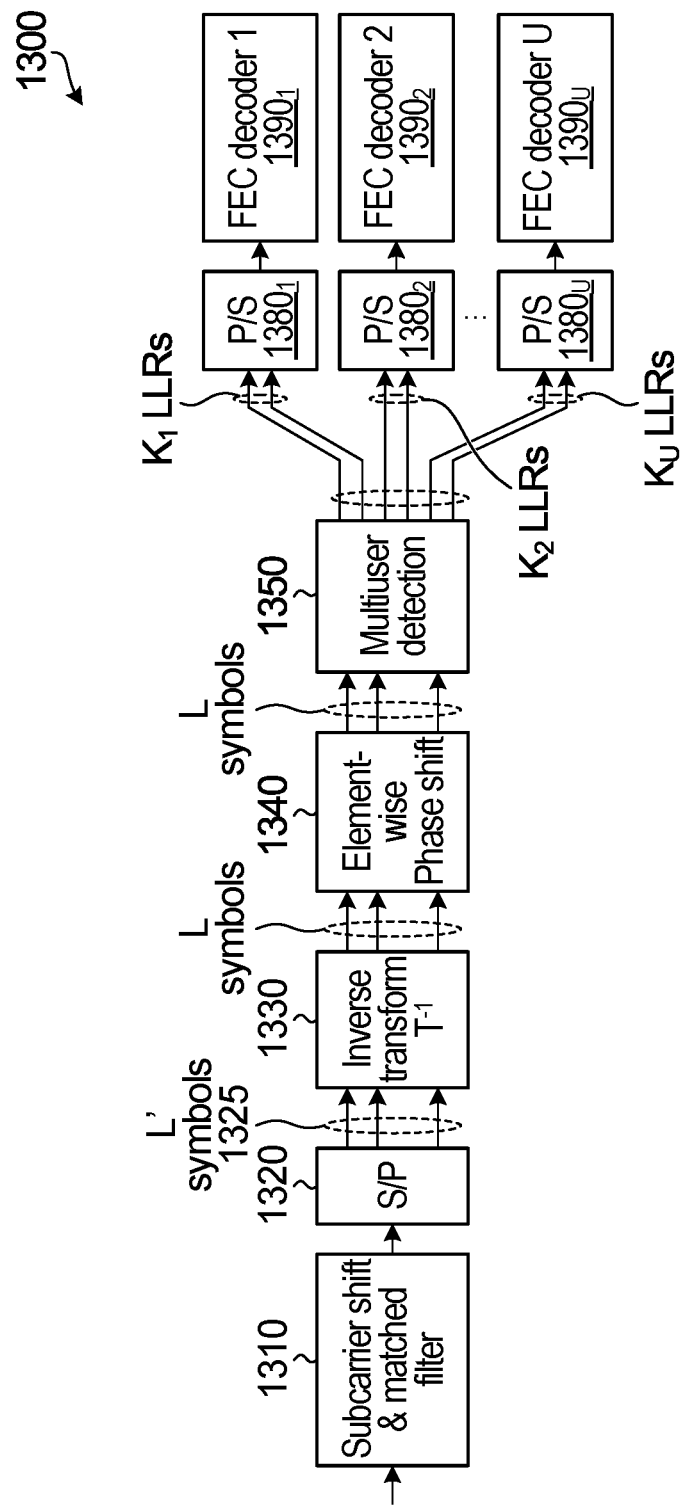
FIG. 13 is a block diagram of an example receiver for use with single-subcarrier pulse-shaped sparse transmission according to a second embodiment of the present disclosure.

FIG. 13 is an example of a receive path 1300 that is complementary to a single subcarrier pulse-shaped sparse transmission transmitter shown in FIG. 6, 7, 8, 10A, 10B or 11A. A received signal that may include transmissions from multiple different UEs over more than one channel is provided to a subcarrier shift and matched filter function 1310. An output from the subcarrier shift and matched filter function 1310 is input to a S/P converter 1320. L' symbols 1325 that are output from the S/P converter 1320 are input to a transform 1330 that is the inverse of the transform used by the transmitter. FIG. 13 includes an element-wise phase shift function 1340 receiving an output of L symbols of the inverse transform 1330. The output of the inverse transform 1330 is labelled as L symbols indicating the same number of symbols output of the S/P 1320. The element-wise phase shift function 1340 outputs to a multi-user detection function 1350. The element-wise phase shift function 1340 is shown with a dashed line, indicating that the function is optional. If it is not included, the output of the inverse transform 1330 would be provided to the multi-user detection function 1350. The multi-user detection function 1350 distinguishes the components specific to each user and then outputs user specific signal components, $K_i$ LLRs i=1 to U, to respective P/S converters 1380$_1$, 1380$_2$, ... 1380$_U$, where $K_i$ is the number of FEC coded bits corresponding to transmitter #i. The LLR values are log-likelihood ratio values that can be used by the FEC decoders to determine the information bits of the respective transmitters. An output of each P/S converter 1380$_1$, 1380$_2$, ... 1380$_U$ is provided to a respective FEC decoder 1390$_1$, 1390$_2$, ... 1390$_U$. Outputs of the FEC decoders 1390$_1$, 1390$_2$, ... 1390$_U$ are information bits transmitted by respective UEs.

In some embodiments, the inverse linear transform (together with an optional phase shift) enables the receiver to use any multiuser detection scheme which is appropriate or specifically designed for the original sparse transmission.

In some embodiments, group-successive interference cancellation (SIC) based decoding may be used at a receiver. When the receiver is aware of the relationship between the sparsity patterns and linear transforms, the receiver can perform the following steps:

Step 1: Jointly decode the data of UEs which use the same linear transform, e.g. by performing the inverse transform and decoding in sparse domain such as MPA, EPA, etc.

Step 2: Perform SIC to remove the signals of the decoded group of UEs from the received signal, and then repeat Step 1 to decode the data of the rest of UEs.

Figure 14:
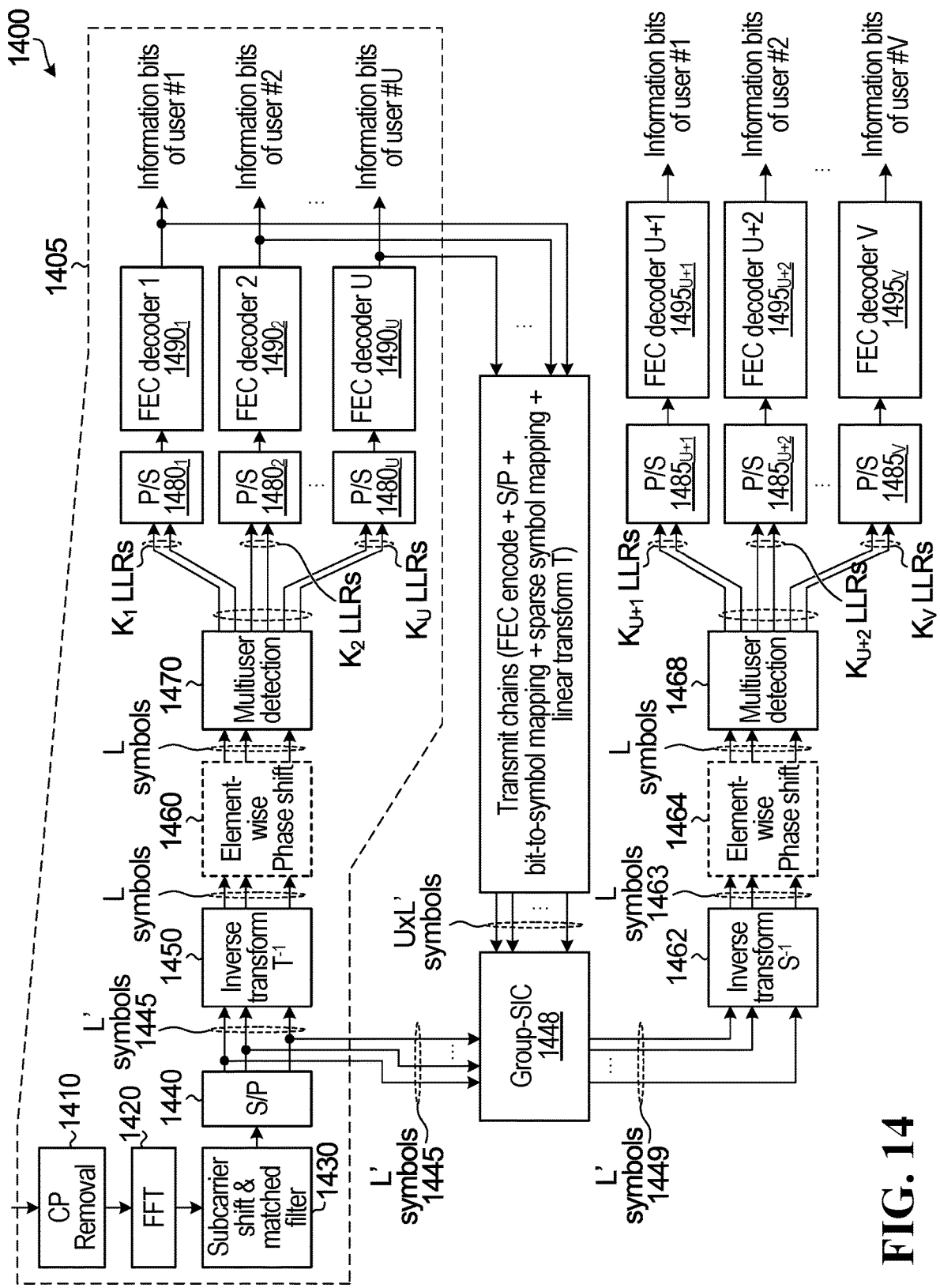
FIG. 14 is a block diagram of an example receiver for use with single-subcarrier CP-OFDMA sparse transmission using succession interference cancellation (SIC) according to a first embodiment of the present disclosure.
Figure 15:
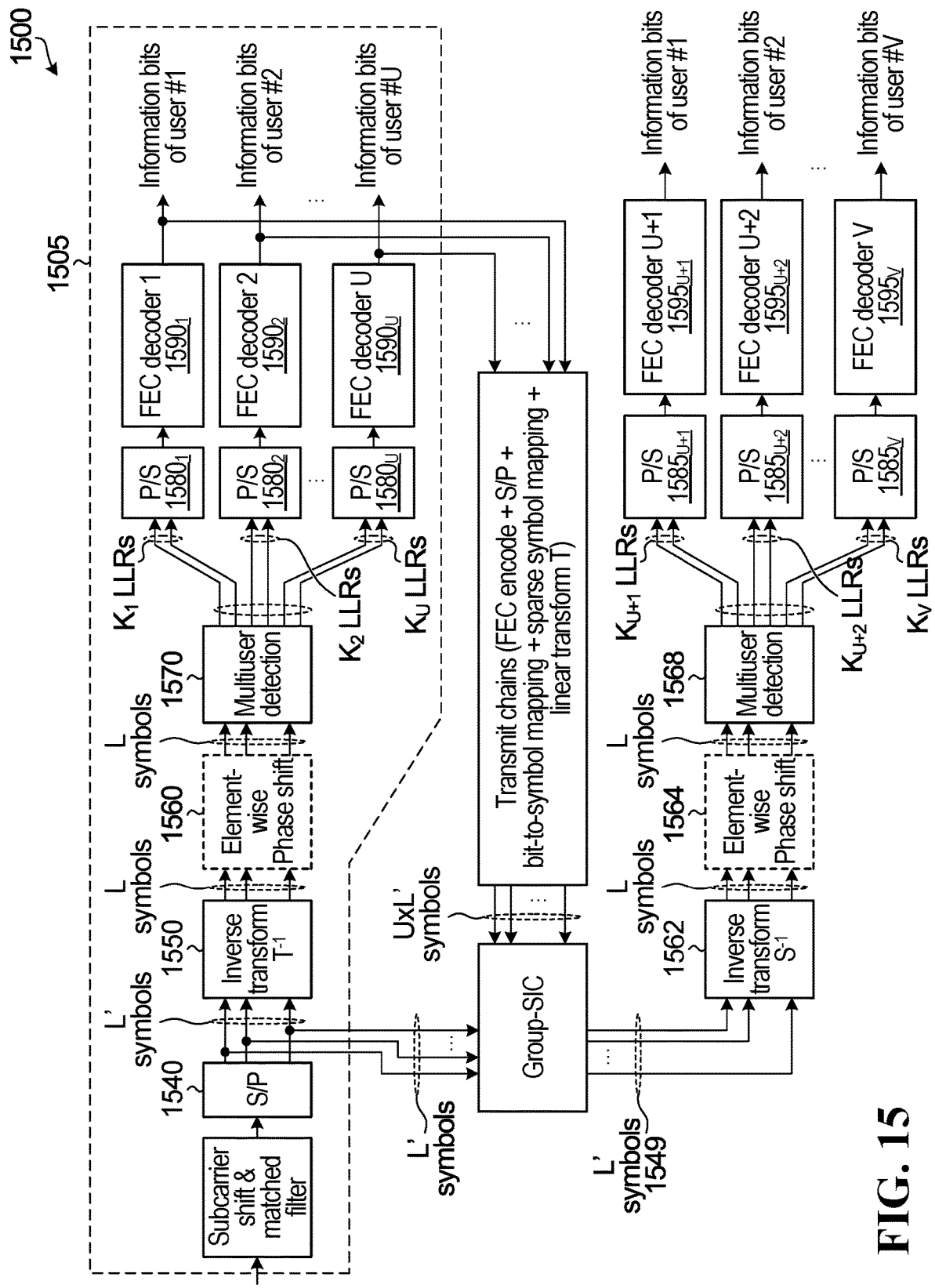
FIG. 15 is a block diagram of an example receiver for use with single-subcarrier pulse-shaped sparse transmission using SIC according to a second embodiment of the present disclosure.

Examples of receivers using SIC based decoding are illustrated in FIGS. 14 and 15.

FIG. 14 is an example of a receive path 1400 that may be used that is complementary to a CP-OFDMA sparse transmission transmitter shown in FIG. 5, 9A, 9B, 10C or 10D. In this example there may be two different linear transforms (and optionally additional phase shift) being used so that transmitters of a first set of the UEs have used a first transform T and transmitters of a second set of the UEs have used a second linear transform S. A first portion 1405 of receive path 1400 includes similar elements and operates in a same manner as receive path 1200 in FIG. 12. In this first transmission path 1405, the inverse transform 1450 corresponds to a first linear transform T used by a first set of transmitters. An element-wise phase shift function 1460 receives an output of the inverse transform 1450. The element-wise phase shift function 1460 outputs to a multi-user detection function 1470. The multi-user detection function 1470 distinguishes the components specific to each user of the first transform and then outputs user specific signal components to respective P/S converters 1480$_1$, 1480$_2$, ... 1480$_U$. Outputs from the FEC decoders 1490$_1$, 1490$_2$, ... 1490$_U$ would be information bits from UEs that used the first linear transform T if their information bits are successfully decoded. Outputs from the S/P converter 1440 and from the FEC decoders 1490$_1$, 1490$_2$, ... 1490$_U$ are fed to a Group SIC function 1448. The Group SIC function 1448 subtracts transmissions that correspond to transmissions that were successfully decoded by the one or more FEC decoders 1490$_1$, 1490$_2$, ... 1490$_U$ from transmissions from the S/P converter 1440 to remove the decoded signals from the received signal. The remaining received signals can be processed to decode signals that correspond to transmissions from transmitters using the second linear transform S. L' symbols 1449 that are output from the Group SIC function 1448 are input to a transform 1462 that is the inverse transform of the second transform S used by transmitters of the second set of UEs. An element-wise phase shift function 1464 receives an output of the inverse transform 1462. The element-wise phase shift function 1464 outputs to a multi-user detection function 1468. The element-wise phase shift function 1464 is shown using a dashed line, indicating that the function is optional. If it is not included, the output of the inverse transform 1462 would be provided to the multi-user detection function 1468. The multi-user detection function 1468 distinguishes the components specific to each user of the second transform and then outputs user specific signal components to respective P/S converters 1485$_{U+1}$, 1485$_{U+2}$, ... 1485$_V$. An output of each P/S converter 1485$_{U+1}$, 1485$_{U+2}$, ... 1485$_V$ is provided to a respective FEC decoder 1495$_{U+1}$, 1495$_{U+2}$, ... 1495$_V$. Outputs from the FEC decoders 1495$_{U+1}$, 1495$_{U+2}$, ... 1495$_V$ would be information bits from UEs that used the second linear transform S.

FIG. 15 is an example of a receive path 1500 that is complementary to a single subcarrier pulse-shaped sparse transmission transmitter shown in FIGS. 6, 7, 8, 10A, 10B and 11. In this example there may be two different transforms being used so that transmitters of a first set of the UEs have used a first linear transform T and transmitters of a second set of the UEs have used a second linear transform S. A first transmission path 1505 of the receiver 1500 is the same as the receiver 1300 in FIG. 13. In this first transmission path 1505, the inverse transform 1550 corresponds to a first linear transform T used by a first set of transmitters. An element-wise phase shift function 1560 receives an output of the inverse transform 1550. The element-wise phase shift function 1560 outputs to a multi-user detection function 1570. The multi-user detection function 1570 distinguishes the components specific to each user of the first transform T and then outputs user specific signal components to respective P/S converters $1580_1$, $1580_2$, ... $1580_U$. Outputs from the FEC decoders $1590_1$, $1450_2$, ... $1450_U$ would be information bits for UEs that used the first transform T if their information bits are successfully decoded. Outputs from the S/P converter 1540 and from the FEC decoders $1590_1$, $1590_2$, ... $1590_U$ are fed to a Group SIC function 1548. The Group SIC function 1548 is subtracts transmissions that correspond to transmissions that were successfully decoded by the one or more FEC decoders $1590_1$, $1590_2$, ... $1590_U$ from transmissions from the S/P converter 1540 to remove the decoded signals from the received signal. The remaining received signals can be processed to decode signals that correspond to transmissions from transmitters using a second linear transform S. L' symbols 1549 output from the Group SIC function 1548 are input to a transform 1562 that is the inverse transform of the second transform S used by transmitters of the second set of UEs. An element-wise phase shift function 1564 receiving an output of the inverse transform 1562. The element-wise phase shift function 1564 outputs to a multi-user detection function 1568. The element-wise phase shift function 1564 is shown using a dashed line, indicating that the function is optional. If it is not included the output of the inverse transform 1562 would be provided to the multi-user detection function 1568. The multi-user detection function 1568 distinguishes the components specific to each user and then outputs user specific signal components to respective P/S converters $1585_{U+1}$, $1585_{U+2}$, ... $1585_V$. An output of each P/S converter $1585_{U+1}$, $1585_{U+2}$, ... $1585_V$ is provided to a respective FEC decoder $1595_{U+1}$, $1595_{U+2}$, ... $1595_V$. Outputs from the FEC decoders $1595_{U+1}$, $1595_{U+2}$, $1595_V$ would be information bits for UEs that used the second linear transform S.

Figure 16:
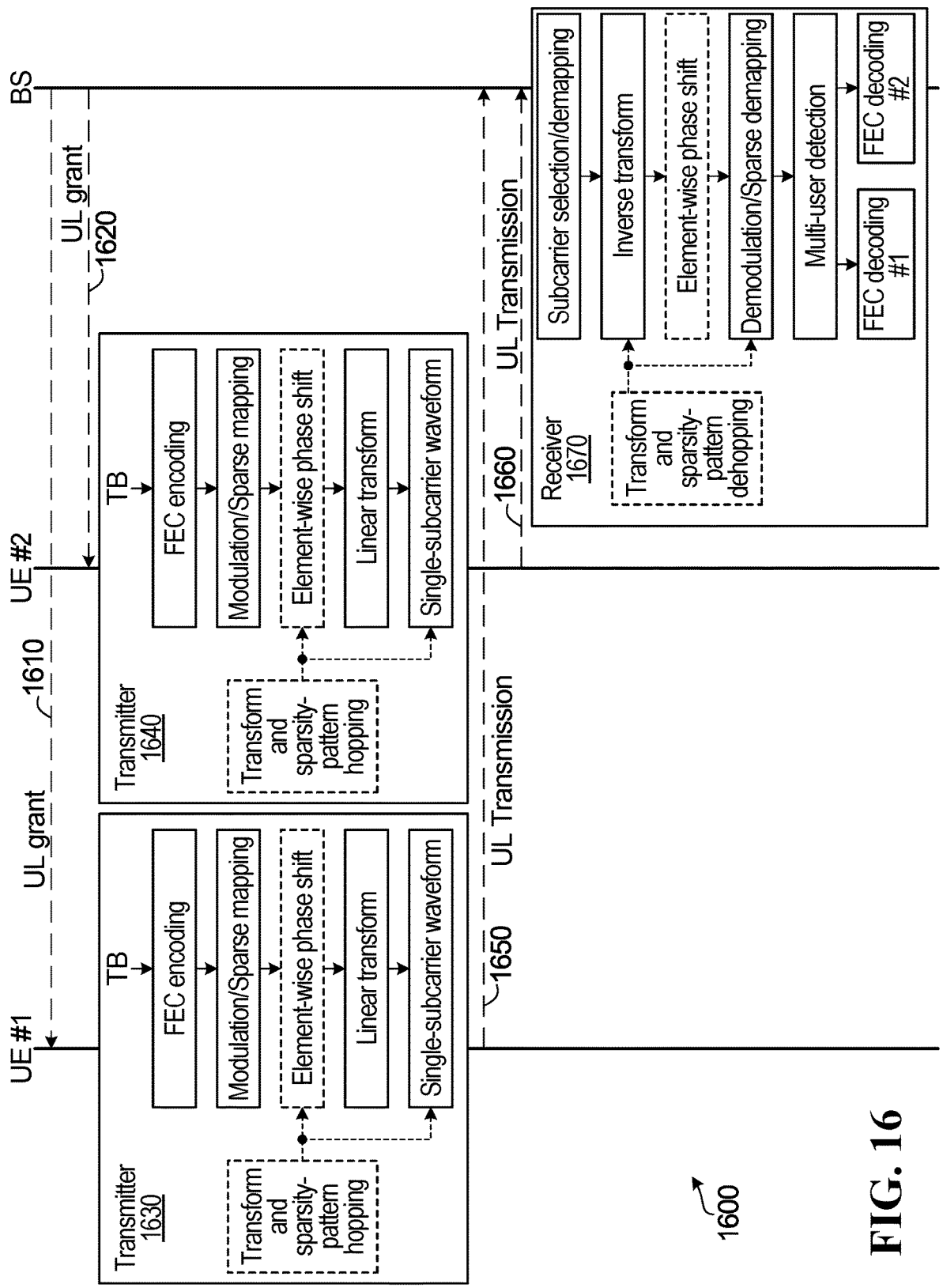
FIG. 16 is a signaling diagram for use between a base station and two user equipment (UEs) that are utilizing single-subcarrier sparse transmission.

FIG. 16 is a representation of a signal flow diagram 1600 for transmissions between a base station BS and two UEs UE #1, UE #2. At 1610 the base station provides an UL grant for UE #1. At 1620 the base station provides an UL grant for UE #2. These UL grants may entail providing configuration information that allows UE #1 and UE #2 to configure the devices to transmit a single subcarrier CP-OFDMA or pulse-shaped sparse transmission. The UL grants are illustrated with dashed lines indicating that these UL grants are optional. UL grants 1610 and 1620 are for part of a grant based methodology for establishing when and how a UE may transmit the sparse mapped and transformed transmission. Instead of a grant based methodology, a grant-free or configured grant methodology may be used to establish when and how a UE may transmit the sparse mapped and transformed transmission. Block 1630 illustrates a series of steps, corresponding to transmitter elements, which are substantially the same as features described in the various embodiments above such as FIGS. 7-11. Block 1640 likewise includes a series of steps, corresponding to transmitter elements, which are substantially the same as features described in the various embodiments above. At 1650 UE #1 transmits an UL transmission that has been prepared based on the UL grant information from 1610 and processing at 1630. At 1660 UE #2 transmits an UL transmission that has been prepared based on the UL grant information from 1620 and processing at 1640. The base station receives the signals from UE #1 and UE #2 and processes the received signals according to the processing in block 1670. Block 1670 includes method steps, corresponding to receiver elements, which are described in embodiments above such as FIGS. 12-15. Although not shown in block 1670, the base station may utilize Group-SIC based processing as described for example in FIGS. 14 and 15.

FIG. 17 is a table showing PAPR (in dB) for different patterns of different types of sparse mapped transmissions determined in a simulation. In all cases, a transmitter transmits a pulse-shaped single-subcarrier signal using root-raised cosine (RRC) pulse with a roll-off factor equal to 0.5. For each case, a sequence of blocks of four time-domain pulse-shaped symbols are transmitted consecutively in time over a single subcarrier. The sparse density for all cases is ½, i.e. two of the four symbols (before linear transform) are non-zero, and so there are six possible sparsity patterns as indexed from 1 to 6 in FIG. 17. As can be seen from the table in FIG. 17, the different patterns have different PAPR values. In some cases the PAPR values may be generally consistent for the six patterns (e.g., pi/2-BPSK IGMA) and in other cases the PAPR values vary by a rather larger amount between the six patterns (e.g., 8-point SCMA+pi/4 +DFT2), Where low PAPR values are determined for some patterns and not all patterns, it may be possible to use only the patterns with the lower PAPR values. For example, these 6 sparsity patterns may correspond to the patterns shown in FIG. 4 being used by the six different UEs. Additional parameters of the various transmission types are given below in Table 1. The additional parameters include the number of bits per block, the type of sparse symbol, the type of block or sub-block transform, the type of transform and whether an element-wise phase shift is included. Tables 2 and 3 include values of the two non-zero values for scenarios in which a two-dimensional symbol is used per block and there are 2 bits per block (Table 2) or 3 bits per block (Table 3).

TABLE 1

Parameter information for various transmission types

| Transmission type | # of bits per block | Sparse symbols | Block/sub-block transform | Transform type | Element-wise phase shift |
|---|---|---|---|---|---|
| 4-point SCMA | 2 | One two-dimensional symbol (See Table 2) | N/A | N/A | N/A |
| pi/2-BPSK IGMA | 2 | Two π/2-BPSK symbols | N/A | N/A | N/A |
| 4-point SCMA + | 2 | One two-dimensional | Block | 4 × 4 | N/A |

TABLE 1-continued

Parameter information for various transmission types

| Transmission type | # of bits per block | Sparse symbols | Block/sub-block transform | Transform type | Element-wise phase shift |
|---|---|---|---|---|---|
| Hadamard4 | | symbol (See Table 2) | transform | Hadamard | |
| 4-point SCMA + DFT4 | 2 | One two-dimensional symbol (See Table 2) | Block transform | 4 × 4 DFT | N/A |
| pi/2-BPSK IGMA + Hadamard4 | 2 | Two π/2-BPSK symbols | Block transform | 4 × 4 Hadamard | N/A |
| pi/2-BPSK IGMA + DFT4 | 2 | Two π/2-BPSK symbols | Block transform | 4 × 4 DFT | N/A |
| 8-point SCMA | 3 | One two-dimensional symbol (See Table 3) | N/A | N/A | N/A |
| 8-point SCMA + Hadamard4 | 3 | One two-dimensional symbol (See Table 3) | Block transform | 4 × 4 Hadamard | N/A |
| 8-point SCMA + pi/4 + Hadamard4 | 3 | One two-dimensional symbol (See Table 3) | Block transform | 4 × 4 Hadamard | Non-zero symbol 1: π/4 Non-zero symbol 2: 0 |
| 8-point SCMA + DFT4 | 3 | One two-dimensional symbol (See Table 3) | Block transform | 4 × 4 DFT | N/A |
| 8-point SCMA + pi/4 + DFT4 | 3 | One two-dimensional symbol (See Table 3) | Block transform | 4 × 4 DFT | Non-zero symbol 1: π/4 Non-zero symbol 2: 0 |
| 8-point SCMA + pi/4 + DFT2 | 3 | One two-dimensional symbol (See Table 3) | Sub-block transform | 2 × 2 DFT | Non-zero symbol 1: π/4 Non-zero symbol 2: 0 |
| pi/4-QPSK IGMA | 4 | Two π/4-QPSK symbols | N/A | N/A | N/A |
| pi/4-QPSK IGMA + Hadamard4 | 4 | Two π/4-QPSK symbols | Block transform | 4 × 4 Hadamard | N/A |
| pi/4-QPSK IGMA + DFT4 | 4 | Two π/4-QPSK symbols | Block transform | 4 × 4 DFT | N/A |
| pi/4-QPSK IGMA + DFT2 | 4 | Two π/4-QPSK symbols | Sub-block transform | 2 × 2 DFT | N/A |

TABLE 2

Non-zero symbol values for different bit combinations (2 bits per block)

| Bit Combination | Non-zero symbol 1 | Non-zero symbol 2 |
|---|---|---|
| 00 | 0.7071 | 0.7071j |
| 01 | 0.7071j | 0.7071 |
| 10 | −0.7071j | 0.7071 |
| 11 | −0.7071 | −0.7071j |

TABLE 3

Non-zero symbol values for different bit combinations (3 bits per block)

| Bit Combination | Non-zero symbol 1 | Non-zero symbol 2 |
|---|---|---|
| 000 | 0.7071 + 0.7071j | −0.7071 + 0.7071j |
| 001 | 0.7071 + 0.7071j | 0.7071 + 0.7071j |
| 010 | −0.7071 − 0.7071j | −0.7071 + 0.7071j |
| 011 | 0.7071 − 0.7071j | 0.7071 + 0.7071j |
| 100 | −0.7071 + 0.7071j | −0.7071 − 0.7071j |
| 101 | 0.7071 + 0.7071j | 0.7071 − 0.7071j |
| 110 | −0.7071 − 0.7071j | −0.7071 − 0.7071j |
| 111 | 0.7071 − 0.7071j | 0.7071 − 0.7071j |

Figure 18:
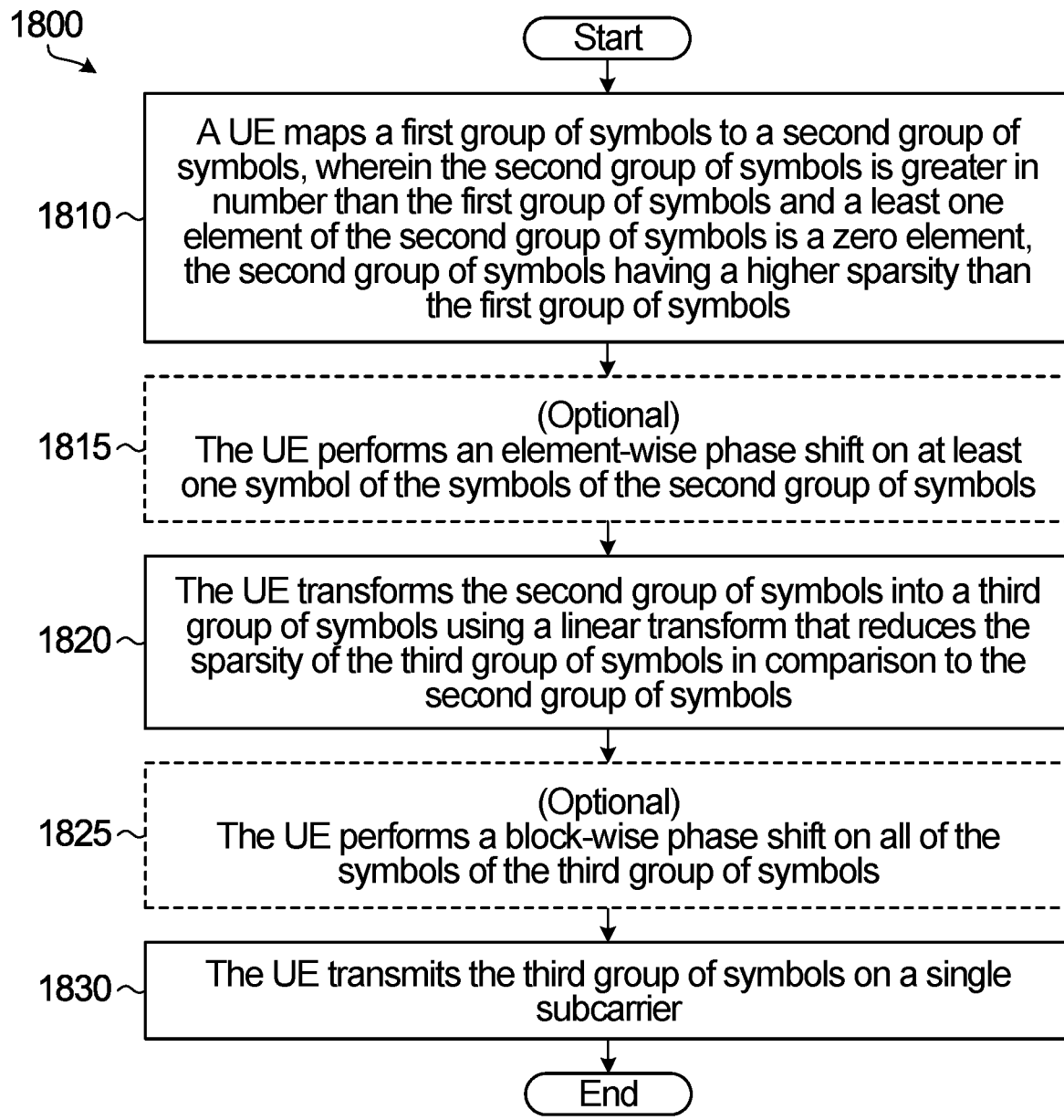
FIG. 18 is a flow chart illustrating a first example method performed by a base station according to an embodiment of the present disclosure.

FIG. 18 is an example flow diagram 1800 that describes a method for reducing Peak-to-Average Power Ratio (PAPR) and/or cubic metric in a single subcarrier transmission. At 1810 a UE maps a first group of symbols to a second group of symbols. The second group of symbols is greater in number than the first group of symbols and a least one element of the second group of symbols is a zero element. The second group of symbols has a higher sparsity than the first group of symbols. At 815, optionally, the UE performs an element-wise phase shift on at least one symbol of the second group of symbols. At 1820, the UE transforms the second group of symbols into a third group of symbols using a linear transform that reduces the sparsity of the third group of symbols in comparison to the second group of symbols. At 1825, optionally, the UE may perform a block-wise phase shift on all of the symbols of the third group of symbols. At 1830, the UE transmits the third group of symbols on a single subcarrier.

In some embodiments, the linear transform may be one of: a predefined linear transform; a modulation and coding scheme (MCS) specific linear transform; a sparsity pattern specific linear transform; or a user equipment (UE) specific linear transform. In some embodiments, transforming the second group of symbols using the linear transform comprises transforming two or more subsets of the second group of symbols each with a respective linear transform, the two or more linear transforms collectively producing the third group of symbols.

In some embodiments, prior to the transmitting, the UE performs a parallel to serial (P/S) conversion on the third group of symbols and then subsequent to the P/S/conversion, performs at least one of pulse shaping and a subcarrier shift.

In some embodiments, prior to the transmitting, the UE performs a P/S conversion on the third group of symbols and then subsequent to the P/S conversion, maps the third group of symbols to the single subcarrier. Subsequent to the mapping, the UE performs an inverse fast Fourier transform (IFFT). Subsequent to the IFFT, the UE performs a cyclic prefix insertion.

In some embodiments, the linear transform and a sparsity pattern together form a hopping group and are hopped together.

In some embodiments, the hopping group includes at least two pairs of values, each pair of values including a linear transform and a sparsity pattern in which a) each of the at least two pairs has a same linear transform, but different sparsity patterns than the other pairs; or b) each of the at least two pairs has one of multiple linear transforms different than the other pairs and one of multiple sparsity patterns different than the other pairs.

In some embodiments, the method may further involve receiving configuration information for an uplink transmission.

In some embodiments, the received configuration information is configured grant configuration information or grant based configuration information.

Figure 19:
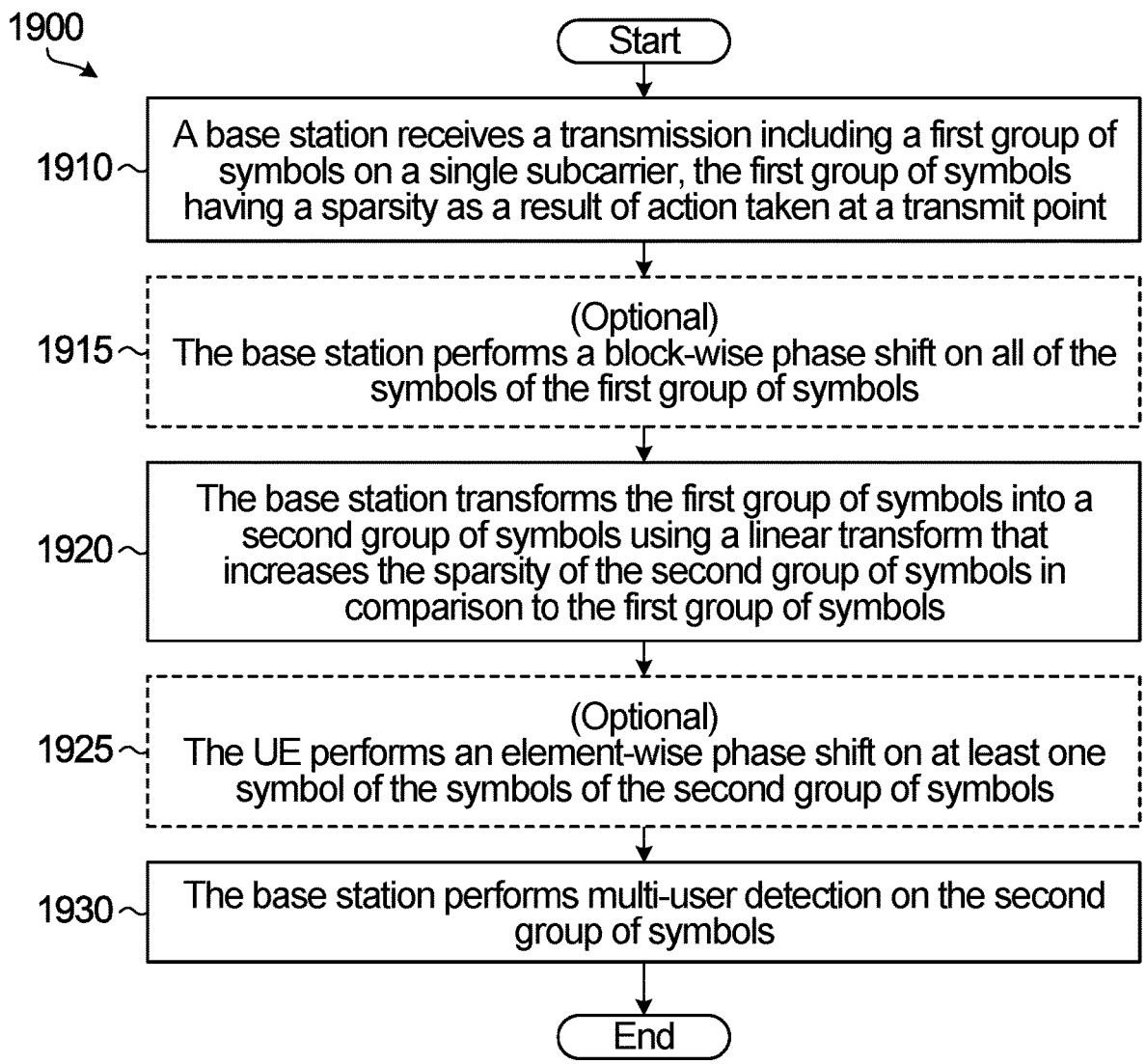
FIG. 19 is a flow chart illustrating a first example method performed by a UE according to an embodiment of the present disclosure.

FIG. 19 is an example flow diagram 1200 that describes a method for reducing PAPR and/or cubic metric in a single subcarrier transmission. At 1910, a base station receives a transmission including a first group of symbols on a single subcarrier, the first group of symbols having a sparsity as a result of actions taken at a transmit point. At 1915, the base station optionally performs a block-wise phase shift on all of the symbols of the first group of symbols. At 1920, the base station transforms the first group of symbols into a second group of symbols using a linear transform that increases the sparsity of the second group of symbols in comparison to the first group of symbols. At 825, optionally, the base station performs an element-wise phase shift on at least one symbol of the second group of symbols. At 1930, the base station performs multi-user detection on the second group of symbols.

In some embodiments, the linear transform may be one of: a predefined linear transform; a modulation and coding scheme (MCS) specific linear transform; a sparsity pattern specific linear transform; or a user equipment (UE) specific linear transform.

In some embodiments, prior to transforming the received transmission, the base station performs at least one of pulse shaping and a subcarrier shift on the received transmission and performs a serial to parallel (S/P) conversion.

In some embodiments, prior to transforming the received transmission, the base station performs a cyclic prefix removal on the received transmission, performs a fast Fourier transform (FFT), de-maps the received transmission from the single subcarrier and performs a S/P conversion.

In some embodiments, when receiving a transmission includes receiving transmissions from more than one source and at least two of the sources use different linear transforms prior to transmission, the steps of transforming the first group of symbols into a second group of symbols and performing multi-user detection involve: transforming first groups of symbols into second groups of symbols using a first linear transform; decoding the second group of symbols that have been transformed using the first linear transform; performing successive interference cancellation (SIC) to remove the decoded second groups of symbols from the received transmissions; transforming remaining first groups of symbols into second groups of symbols using a second linear transform; and decoding the second groups of symbols that have been transformed using the second linear transform.

In some embodiments, the method may further involve transmitting configuration information for an uplink transmission.

In some embodiments, the transmitted configuration information is configured grant configuration information or grant based configuration information.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for reducing Peak-to-Average Power Ratio (PAPR) of single subcarrier transmissions, the method comprising:

mapping a first group of symbols to a second group of symbols having a higher sparsity than the first group of symbols, wherein the second group of symbols has a greater number of symbols than the first group of symbols and wherein at least one symbol of the second group of symbols is a zero symbol;

transforming the second group of symbols into a third group of symbols having no sparsity by partitioning the second group of symbols into a plurality of sub-blocks of symbols and applying one or more linear transforms to the sub-blocks of symbols to collectively produce the third group of symbols; and transmitting the third group of symbols on a single subcarrier.

2. The method of claim 1 further comprising:

prior to transmitting, performing a parallel to serial (P/S) conversion on the third group of symbols; and subsequent to the P/S conversion, performing at least one of pulse shaping and a subcarrier shift on the P/S converted third group of symbols.

3. The method of claim 2, wherein each of the one or more linear transforms is one of:

a predefined linear transform;

a modulation and coding scheme (MCS) specific linear transform;

a sparsity pattern specific linear transform; and a user equipment (UE) specific linear transform.

4. The method of claim 1 further comprising:

prior to transmitting, performing a parallel to serial (P/S) conversion on the third group of symbols;

subsequent to the P/S conversion, performing a subcarrier mapping of the P/S converted third group of symbols;

subsequent to the subcarrier mapping, performing an inverse fast Fourier transform (IFFT) of the subcarrier mapped third group of symbols; and subsequent to the IFFT, performing cyclic prefix insertion to add a cyclic prefix to the third group of symbols on which the IFFT is performed.

5. The method of claim 1 further comprising performing a phase shift on at least one symbol of the second group of symbols.

6. The method of claim 1 further comprising performing a block-wise phase shift on all of the symbols of the third group of symbols.

7. The method of claim 1, wherein the transforming comprises performing a matrix operation and each linear transform is a unitary matrix.

8. The method of claim 7, wherein the unitary matrix is any one of: a discrete Fourier transform (DFT) matrix; an inverse DFT (IDFT) matrix; and a Hadamard matrix.

9. The method of claim 1 further comprising receiving an identification of each of the plurality of the linear transforms using higher layer signaling.

10. The method of claim 1 further comprising changing both the one or more linear transforms and a sparsity pattern off the second group of symbols generated by the mapping at the same time.

11. The method of claim 1 further comprising changing values of the one or more linear transforms and a sparsity pattern of the second group of symbols generated by the mapping independently of each other.

12. The method of claim 1 further comprising, prior to mapping the first group of symbols to the second group of symbols, receiving configuration information to be used for defining a transmission resource for transmitting the third group of symbols on the single subcarrier.

13. A method for receiving single subcarrier transmissions having a reduced Peak-to-Average Power Ratio (PAPR), the method comprising:

receiving a transmission including a first group of symbols on a single subcarrier, wherein none of the symbols of the first group of symbols is a zero symbol;

transforming the first group of symbols into a second group of symbols one or more linear transforms such that at least one symbol of the second group of symbols is a zero symbol to increases the sparsity of the second group of symbols in comparison to the first group of symbols; and performing multi-user detection on the second group of symbols.

14. The method of claim 13 further comprising, prior to the transforming:

performing at least one of pulse shaping and a subcarrier shift on the received transmission; and performing a serial to parallel (S/P) conversion on the received transmission that has been at least one of pulse shaped and subcarrier shifted.

15. The method of claim 13 further comprising, prior to the transforming:

performing cyclic prefix removal on the received transmission to remove a cyclic prefix in the received transmission;

performing a fast Fourier transform (FFT) on the received transmission with the removed cyclic prefix;

performing a subcarrier de-mapping on the received transmission on which the FFT is performed on the received transmission on which the subcarrier is performed; and performing a serial to parallel (S/P) conversion.

16. The method of claim 13 further comprising, prior to the performing multi-user detection on the second group of symbols, performing a phase shift on at least one symbol of the second group of symbols.

17. The method of claim 13 further comprising, prior to the transforming the, performing a block-wise phase shift on all of the symbols of the first group of symbols.

18. The method of claim 13, wherein the transforming comprises performing a matrix operation and each of the one or more linear transforms utilizes a unitary matrix.

19. The method of claim 18, wherein the unitary matrix is any one of: a discrete Fourier transform (DFT) matrix; an inverse DFT (IDFT) matrix; and a Hadamard matrix.

20. The method of claim 13, wherein each of the one or more linear transforms is one of:

a predefined linear transform;

a modulation and coding scheme (MCS) specific linear transform;

a sparsity pattern specific linear transform; and a user equipment (UE) specific linear transform.

21. The method of claim 13 further comprising, prior to receiving a transmission including a first group of symbols on a single subcarrier, transmitting configuration information to be used for defining a transmission resource for transmission on a single subcarrier.

* * * * *